US012628026B2

(12) United States Patent
Huang et al.

(10) Patent No.: US 12,628,026 B2
(45) Date of Patent: May 12, 2026

(54) SENSING-BASED ENERGY HARVESTING AND MANAGEMENT FOR AMBIENT INTERNET OF THINGS DEVICES

(71) Applicant: QUALCOMM Incorporated, San Diego, CA (US)

(72) Inventors: Fei Huang, San Diego, CA (US); Dai Lu, San Diego, CA (US); Duo Zhang, San Diego, CA (US); Haohao Qin, San Diego, CA (US); Weimin Duan, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 18/679,143

(22) Filed: May 30, 2024

(65) Prior Publication Data

US 2025/0374096 A1     Dec. 4, 2025

(51) Int. Cl.
*H04W 24/10* (2009.01)
*G16Y 20/30* (2020.01)
*H04W 52/02* (2009.01)

(52) U.S. Cl.
CPC ............. *H04W 24/10* (2013.01); *G16Y 20/30* (2020.01); *H04W 52/02* (2013.01)

(58) Field of Classification Search
CPC ....... H04W 52/02; H04W 24/10; G16Y 20/30
See application file for complete search history.

(56) References Cited

U.S. PATENT DOCUMENTS

| | | | | |
|---|---|---|---|---|
| 2021/0101680 A1* | 4/2021 | Naderi | .................. | H02J 50/402 |
| 2021/0105869 A1* | 4/2021 | Mo | ........................ | H04W 12/73 |
| 2023/0344279 A1* | 10/2023 | Glover | ...................... | H02J 7/02 |
| 2024/0421636 A1* | 12/2024 | Glover | .................... | H02J 50/10 |

* cited by examiner

*Primary Examiner* — Todd L Barker
(74) *Attorney, Agent, or Firm* — Holland & Hart LLP

(57) ABSTRACT

Methods, systems, and devices for wireless communications are described. A network entity may implement sensing to assist in energy harvesting. In some examples, the network entity may employ radio-frequency sensing and a learning model to determine locations of an ambient internet of things (AIoT) device and at least one UE. In some examples, the network entity may determine to charge the AIoT device based on the sensing. In some other examples, the network entity may determine capabilities of the AIoT device and the at least one UE based on the sensing and may determine to charge the AIoT device based on the capabilities. To charge the AIoT device, the network entity may transmit a sensing waveform as a power charging resource for an energy harvesting operation for the AIoT device, or may request the at least one UE to transmit the sensing waveform, or both.

17 Claims, 20 Drawing Sheets

— 500

130          105                          115

Network
Entity

Transceiver                    Antenna 910                            915

Communications
Manager                    Memory

Code

930

920                        925

940                        Processor

935

905

900

1010

1020

1015

1005

1000

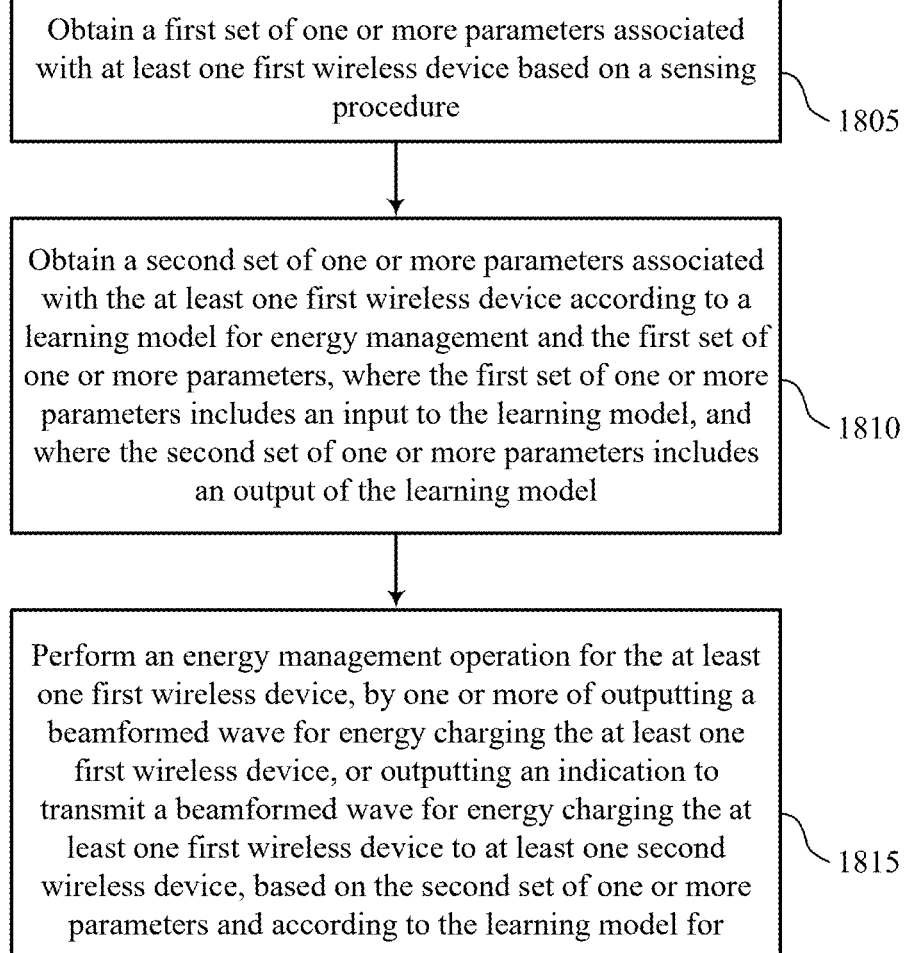

Obtain a first set of one or more parameters associated with at least one first wireless device based on a sensing procedure

1805

Obtain a second set of one or more parameters associated with the at least one first wireless device according to a learning model for energy management and the first set of one or more parameters, where the first set of one or more parameters includes an input to the learning model, and where the second set of one or more parameters includes an output of the learning model

1810

Perform an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management

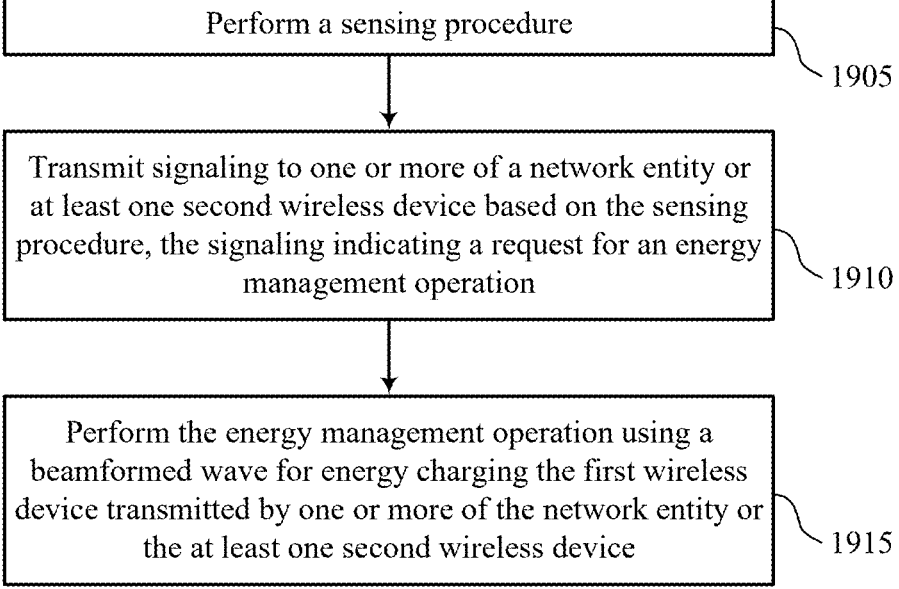

| Perform a sensing procedure |
|---|

1905

| Transmit signaling to one or more of a network entity or at least one second wireless device based on the sensing procedure, the signaling indicating a request for an energy management operation |
|---|

1910

| Perform the energy management operation using a beamformed wave for energy charging the first wireless device transmitted by one or more of the network entity or the at least one second wireless device |
|---|

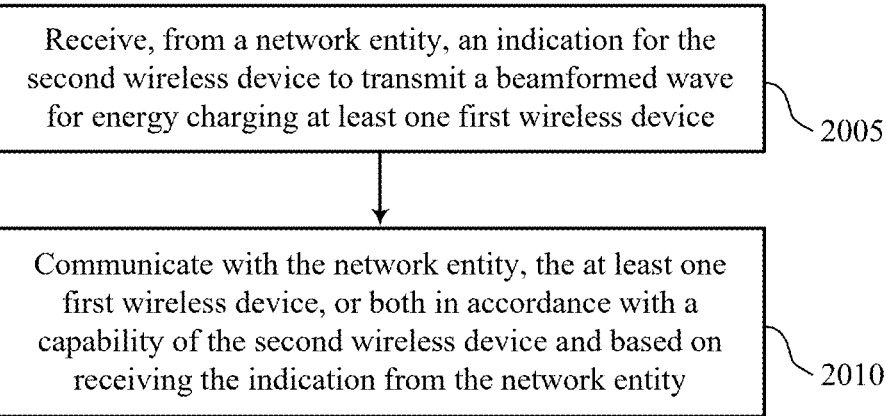

Receive, from a network entity, an indication for the second wireless device to transmit a beamformed wave for energy charging at least one first wireless device

2005

Communicate with the network entity, the at least one first wireless device, or both in accordance with a capability of the second wireless device and based on receiving the indication from the network entity

SENSING-BASED ENERGY HARVESTING AND MANAGEMENT FOR AMBIENT INTERNET OF THINGS DEVICES

TECHNICAL FIELD

The following relates to wireless communications, including sensing-based energy harvesting and management for ambient internet of things (AIoT) devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a network entity is described. The method may include obtaining a first set of one or more parameters associated with at least one first wireless device based on a sensing procedure, obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model, and performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the network entity to obtain a first set of one or more parameters associated with at least one first wireless device based on a sensing procedure, obtain a second set of one or more parameters associated with the at least one first wireless device according to a learning model for energy management and the first set of one or more parameters, where the first set of one or more parameters includes an input to the learning model, and where the second set of one or more parameters includes an output of the learning model, and perform an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

Another network entity for wireless communications is described. The network entity may include means for obtaining a first set of one or more parameters associated with at least one first wireless device based on a sensing procedure, means for obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model, and means for performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

A non-transitory computer-readable medium storing code for wireless communications is described. The code may include instructions executable by one or more processors (e.g., directly, indirectly, after pre-processing, without pre-processing) to obtain a first set of one or more parameters associated with at least one first wireless device based on a sensing procedure, obtain a second set of one or more parameters associated with the at least one first wireless device according to a learning model for energy management and the first set of one or more parameters, where the first set of one or more parameters includes an input to the learning model, and where the second set of one or more parameters includes an output of the learning model, and perform an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

Some examples of the method, network entities, and non-transitory computer-readable medium described herein may further include operations, features, means, or instructions for scheduling one or more resources for outputting the beamformed wave based on the first set of one or more parameters and the second set of one or more parameters and according to the learning model for energy management.

Some examples of the method, network entities, and non-transitory computer-readable medium described herein may further include operations, features, means, or instructions for determining a capability of the at least one second wireless device based on the sensing procedure and where performing the energy management operation may be in accordance with the capability of the at least one second wireless device.

Some examples of the method, network entities, and non-transitory computer-readable medium described herein may further include operations, features, means, or instructions for receiving signaling from the at least one first wireless device indicating a request for an energy management operation for the at least one first wireless device, where the signaling includes an input to the learning model and where performing the energy management operation may be based on receiving the signaling from the at least one first wireless device.

Some examples of the method, network entities, and non-transitory computer-readable medium described herein may further include operations, features, means, or instructions for receiving signaling from the at least one second wireless device indicating a request for an energy management operation for the at least one first wireless device, where the signaling includes an input to the learning model and where performing the energy management operation may be based on receiving the signaling from the at least one second wireless device.

Some examples of the method, network entities, and non-transitory computer-readable medium described herein may further include operations, features, means, or instructions for obtaining a third set of one or more parameters associated with the at least one first wireless device according to the learning model and based on a handover event at the at least one first wireless device.

In some examples of the method, network entities, and non-transitory computer-readable medium described herein, the beamformed wave may be a frequency modulated continuous wave (FMCW) waveform, an orthogonal frequency-division multiplexing (OFDM) waveform, or another sensing waveform.

A method for wireless communications by an apparatus is described. The method may include performing a sensing procedure, transmitting signaling to one or more of a network entity or at least one second wireless device based on the sensing procedure, the signaling indicating a request for an energy management operation, and performing the energy management operation using a beamformed wave for energy charging the first wireless device transmitted by one or more of the network entity or the at least one second wireless device.

An apparatus for wireless communications is described. The apparatus may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the apparatus to perform a sensing procedure, transmit signaling to one or more of a network entity or at least one second wireless device based on the sensing procedure, the signaling indicating a request for an energy management operation, and perform the energy management operation using a beamformed wave for energy charging the first wireless device transmitted by one or more of the network entity or the at least one second wireless device.

Another apparatus for wireless communications is described. The apparatus may include means for performing a sensing procedure, means for transmitting signaling to one or more of a network entity or at least one second wireless device based on the sensing procedure, the signaling indicating a request for an energy management operation, and means for performing the energy management operation using a beamformed wave for energy charging the first wireless device transmitted by one or more of the network entity or the at least one second wireless device.

A non-transitory computer-readable medium storing code for wireless communications is described. The code may include instructions executable by one or more processors (e.g., directly, indirectly, after pre-processing, without pre-processing) to perform a sensing procedure, transmit signaling to one or more of a network entity or at least one second wireless device based on the sensing procedure, the signaling indicating a request for an energy management operation, and perform the energy management operation using a beamformed wave for energy charging the first wireless device transmitted by one or more of the network entity or the at least one second wireless device.

Some examples of the method, apparatus, and non-transitory computer-readable medium described herein may further include operations, features, means, or instructions for performing one or more measurements on the beamformed wave for energy charging the first wireless device and transmitting a report to the network entity indicating a signal strength of the beamformed wave, a battery level of the first wireless device, or both.

In some examples of the method, apparatus, and non-transitory computer-readable medium described herein, the first wireless device performs the one or more measurements based on the signal strength of the beamformed wave satisfying a threshold, based on the battery level satisfying a threshold, or in accordance with a periodicity.

Some examples of the method, apparatus, and non-transitory computer-readable medium described herein may further include operations, features, means, or instructions for refraining from transmitting a second report to the network entity based on the battery level satisfying a threshold.

Some examples of the method, apparatus, and non-transitory computer-readable medium described herein may further include operations, features, means, or instructions for receiving an indication from the network entity to refrain from transmitting a second report.

Some examples of the method, apparatus, and non-transitory computer-readable medium described herein may further include operations, features, means, or instructions for transmitting, to the network entity, a report indicating a status of the first wireless device based on performing the energy management operation and receiving a request to report the status of the at least one second wireless device from the network entity.

In some examples of the method, apparatus, and non-transitory computer-readable medium described herein, the beamformed wave may be an FMCW waveform, an OFDM waveform, or another sensing waveform.

In some examples of the method, apparatus, and non-transitory computer-readable medium described herein, the signaling includes a last report message or a power request message.

A method for wireless communications by a second wireless device is described. The method may include receiving, from a network entity, an indication for the second wireless device to transmit a beamformed wave for energy charging at least one first wireless device and communicating with the network entity, the at least one first wireless device, or both in accordance with a capability of the second wireless device and based on receiving the indication from the network entity.

A second wireless device for wireless communications is described. The second wireless device may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the second wireless device to receive, from a network entity, an indication for the second wireless device to transmit a beamformed wave for energy charging at least one first wireless device and communicate with the network entity, the at least one first wireless device, or both in accordance with a capability of the second wireless device and based on receiving the indication from the network entity.

Another second wireless device for wireless communications is described. The second wireless device may include means for receiving, from a network entity, an indication for the second wireless device to transmit a beamformed wave for energy charging at least one first wireless device and means for communicating with the network entity, the at least one first wireless device, or both in accordance with a capability of the second wireless device and based on receiving the indication from the network entity.

A non-transitory computer-readable medium storing code for wireless communications is described. The code may include instructions executable by one or more processors (e.g., directly, indirectly, after pre-processing, without pre-processing) to receive, from a network entity, an indication for the second wireless device to transmit a beamformed wave for energy charging at least one first wireless device and communicate with the network entity, the at least one first wireless device, or both in accordance with a capability of the second wireless device and based on receiving the indication from the network entity.

Some examples of the method, second wireless devices, and non-transitory computer-readable medium described herein may further include operations, features, means, or instructions for receiving signaling from the at least one first wireless device and relaying the signaling from the at least one first wireless device to the network entity in accordance with the capability of the second wireless device.

Some examples of the method, second wireless devices, and non-transitory computer-readable medium described herein may further include operations, features, means, or instructions for monitoring resources for signaling from the at least one first wireless device to the network entity in accordance with a request from the network entity to monitor the at least one first wireless device and relaying the signaling to the network entity based on determining that the network entity failed to receive the signaling from the at least one first wireless device.

In some examples of the method, second wireless devices, and non-transitory computer-readable medium described herein, communicating with the network entity, the at least one first wireless device, or both may include operations, features, means, or instructions for determining one or more parameters associated with the beamformed wave for energy charging the at least one first wireless device and transmitting the beamformed wave to the at least one first wireless device.

In some examples of the method, second wireless devices, and non-transitory computer-readable medium described herein, the beamformed wave may be an FMCW waveform, an OFDM waveform, or another sensing waveform.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 18 through 20 show flowcharts illustrating methods that support sensing-based energy harvesting and management for ambient internet of things devices in accordance with one or more aspects of the present disclosure.

DETAILED DESCRIPTION

Figure 1:
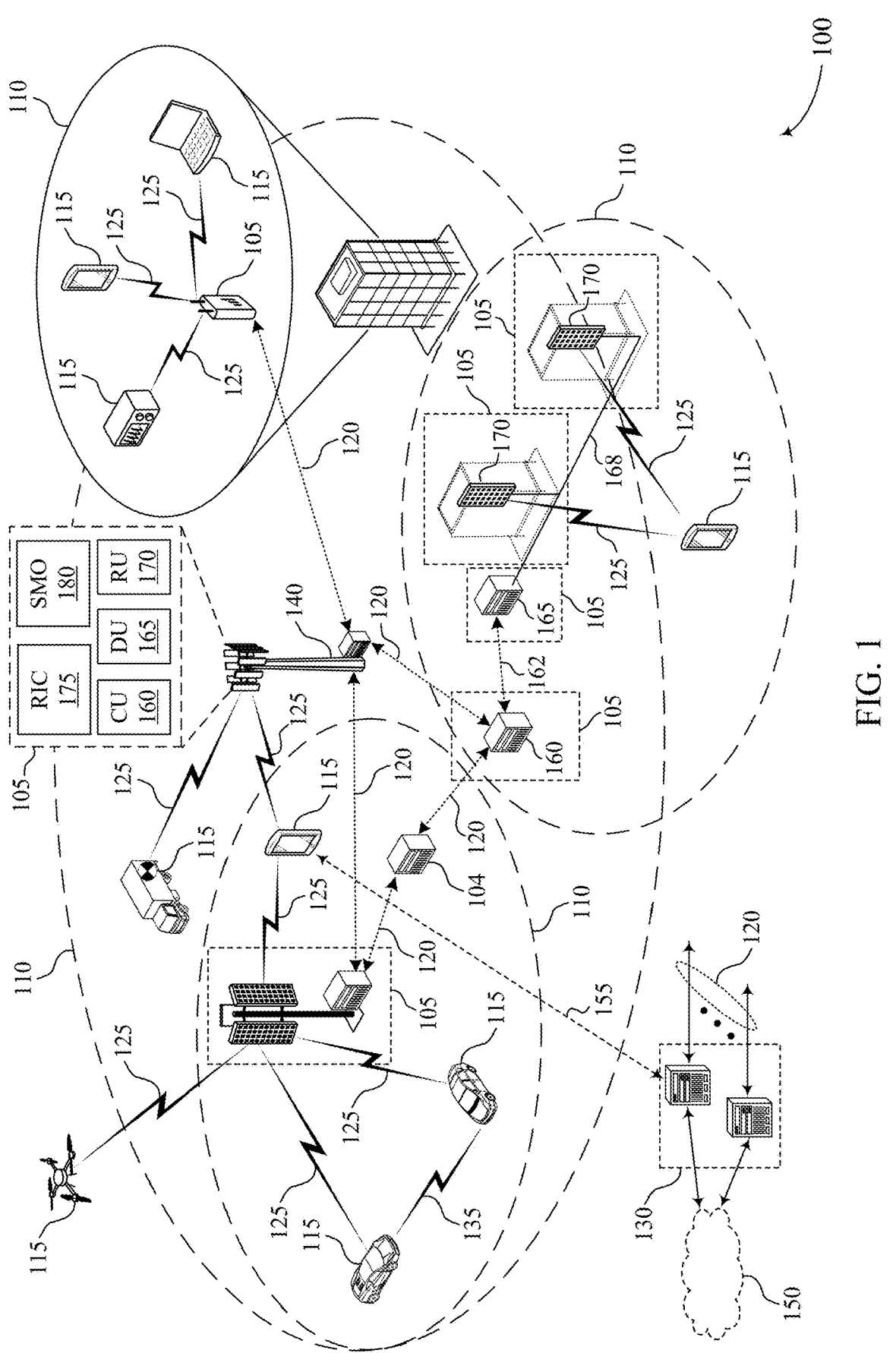
FIGS. 1 through 4 show examples of wireless communications systems that support sensing-based energy harvesting and management for ambient internet of things devices in accordance with one or more aspects of the present disclosure.

In some wireless communications systems, some wireless devices may implement energy harvesting techniques to improve device uptime and reliability. In some examples, ambient Internet of Things (AIoT) devices may implement passive energy harvesting while also communicating with other devices. For example, a first AIoT device (e.g., a network entity, a user equipment (UE)) may transmit a beamformed wave to a second AIoT device (e.g., a UE). The second AIoT device may use the beamformed wave to charge a battery of the second AIoT device. However, in such examples, passive energy harvesting may charge the second AIoT device at a low efficiency. That is, there may be a duration before a charge level of the second AIoT device satisfies a threshold (e.g., is fully charged). In some examples, the second AIoT device may be unaware of a location of the first AIoT device. The first AIoT device may transmit a broad beamformed wave to improve coverage, but transmitting the broad beam may be energy efficient. Additionally, the second AIoT device may have a low power (e.g., a low transmit power), and beams (e.g., reference signals, pilot signals) may not reach the first AIoT device. Alternatively, the second AIoT device may be dead (e.g., may have no charge) or may otherwise be unable to indicate a request for charging to the first AIoT device.

Various aspects of the present disclosure relate to sensing-based energy harvesting and management for AIoT devices. In some wireless communications systems, a network entity and a target UE may implement sensing procedures to assist in energy harvesting operations. In some examples, the network entity may implement a sensing procedure to determine a location of the target UE and based on the sensing procedure, may determine to charge the target UE. For example, the network entity may transmit a sensing wave-form (e.g., a frequency modulated continuous wave (FMCW), an orthogonal frequency division multiplexing (OFDM) waveform)) as a power charging resource for an energy harvesting operation at the target UE. Alternatively, the network entity may indicate for a nearby UE to transmit the sensing waveform for energy harvesting to the target UE. In some other examples, the network entity and the target UE may implement the sensing procedure to determine capabilities of the target UE and other nearby UEs within the wireless communications system. The target UE may transmit an indication of charging to a nearby UE based on the sensing procedure, which may relay the indication to the network entity. Similarly, based on the capabilities, the indication, or both, the network entity may either transmit the sensing waveform or indicate for a nearby UE to transmit the sensing waveform. Additionally, the network entity and the target UE may implement sensing procedures to assist in performing energy harvesting during UE mobility management, such as during UE handover.

Aspects of the disclosure are initially described in the context of wireless communications systems. Aspects of the disclosure are additionally illustrated with respect to process flows. Aspects of the disclosure are further illustrated by and described with reference to apparatus diagrams, system diagrams, and flowcharts that relate to sensing-based energy harvesting and management for ambient internet of things devices.

FIG. 1 shows an example of a wireless communications system 100 that supports sensing-based energy harvesting and management for ambient internet of things devices in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transactionbased business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, a network entity 105 may implement sensing procedures to assist in energy harvesting operations. In some examples, the network entity 105 may implement a sensing procedure to determine location information for one or more UEs 115 in communication with the network entity 105. The one or more UEs 115 may include at least one AIoT device. The network entity 105 may use the results of the sensing procedure as an input to a learning model and may determine the location information using the learning model. Based on the location information, the network entity 105 may determine to charge the AIoT device. For example, the network entity 105 may transmit a sensing waveform (e.g., an FMCW waveform, an OFDM waveform) as a power charging resource for an energy harvesting operation at the AIoT device. Alternatively, the network entity 105 may request at least one of the one or more UEs 115 to transmit the sensing waveform for energy harvesting to the AIoT device.

In some other examples, the network entity 105 may implement the sensing procedure to determine capabilities of the one or more UEs 115 and the AIoT device. For example, the network entity 105 may determine whether each device (e.g., a UE 115, an AIoT device) is capable of transmitting an energy harvesting waveform (e.g., a power charging resource), is capable of receiving and relaying signaling from the AIoT device, both, or neither. In some cases, the AIoT device may transmit a request for an energy harvesting operation to the network entity 105. In some other cases, the AIoT device may transmit the request to a UE 115, which may relay the request to the network entity 105. Based on the capabilities and the request, the network entity 105 may either transmit the sensing waveform to the AIoT device, may request for at least one of the UEs 115 to transmit the sensing waveform, or both. Additionally, the network entity 105 may implement sensing procedures to assist in performing energy harvesting during mobility management operations, such as during handover of the AIoT device.

Figure 2:
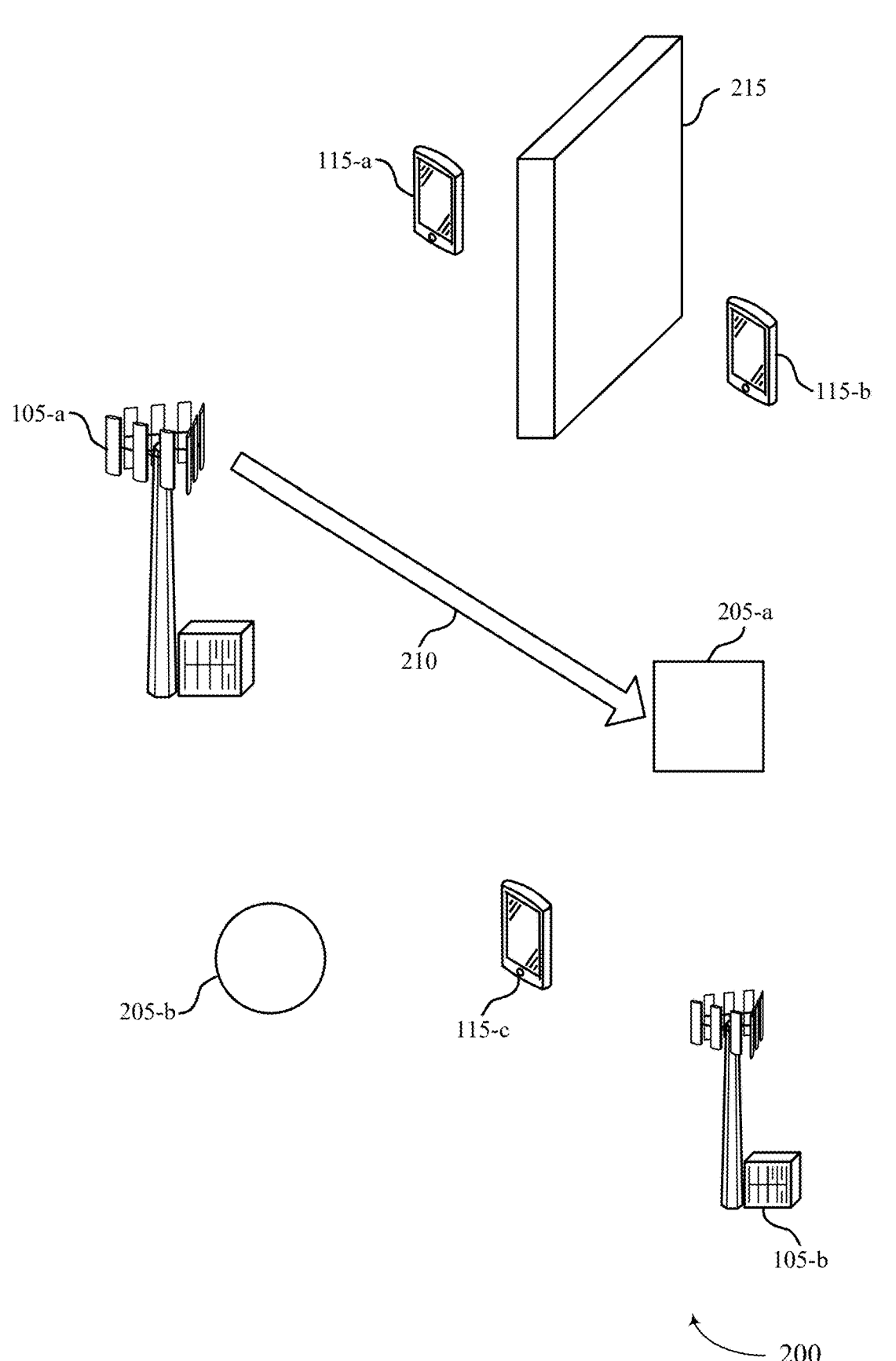

FIG. 2 shows an example of a wireless communications system 200 that supports sensing-based energy harvesting and management for ambient internet of things devices in accordance with one or more aspects of the present disclosure. The wireless communications system 200 may include a primary network entity 105-a, a nearby network entity 105-b, and multiple UEs 115, including a first nearby UE 115-a, a second nearby UE 115-b, and a third nearby UE 115-c, which may be examples of corresponding devices and structures described herein, including with reference to FIG. 1. Alternatively, the primary network entity 105-a, the nearby network entity 105-b, the first nearby UE 115-a, the second nearby UE 115-b, and the third nearby UE 115-c may be examples of network nodes, such as a CU, a DU, an RU, an access point, a smart router, or any combination thereof.

The wireless communications system 200 may also include one or more ambient IoT (AIoT) devices 205, including a first AIoT device 205-a and a second AIoT device 205-b. The AIoT devices 205 may be examples of corresponding devices described herein, including with reference to FIG. 1. Each AIoT device 205 may be associated with a shape. In the example of FIG. 2, the first AIoT device 205-*a* may be rectangular in shape and may be associated with three dimensions corresponding to a length, a width, and a height of the first AIoT device 205-*a*. The second AIoT device 205-*b* may be spherical in shape and may be associated with one dimension corresponding to a radius of the sphere. In the example of FIG. 2, the first AIoT device 205-*a* and the second AIoT device 205-*b* may not be UEs 115 as described with reference to FIG. 1. However, in some other examples, the first AIoT device 205-*a*, the second AIoT device 205-*b*, or both, may be UEs 115 as described with reference to FIG. 1.

Some or all of the wireless devices within the wireless communications system 200 may be Sixth Generation (6G) devices. In the example of FIG. 2, the primary network entity 105-*a*, the nearby network entity 105-*b*, the first nearby UE 115-*a*, the second nearby UE 115-*b*, and the third nearby UE 115-*c* may be 6G devices. 6G devices may support sensing procedures. For example, the primary network entity 105-*a* may transmit one or more sensing waveforms, such as a frequency modulated continuous-wave (FMCW) waveform, an orthogonal frequency-division multiplexing (OFDM) waveform, or another type of sensing waveform. The sensing waveform may be reflected by an object, and the primary network entity 105-*a* may receive the reflected sensing waveform and compare the reflected sensing waveform to the original sensing waveform to determine information about the operating environment of the primary network entity 105-*a*.

In addition to supporting sensing procedures, some or all of the UEs 115 may be capable of communicating signaling with the other UEs 115. In the example of FIG. 2, the first nearby UE 115-*a*, the second nearby UE 115-*b*, and the third nearby UE 115-*c* may be capable of receiving and decoding messages from each of the first nearby UE 115-*a*, the second nearby UE 115-*b*, and the third nearby UE 115-*c*. The UEs 115 may be within a coverage area (not shown) of the primary network entity 105-*a*.

AIoT devices 205 may be capable of performing radio-frequency energy management (e.g., energy harvesting) procedures. For example, an AIoT device 205 may receive an energy harvesting waveform and may passively accumulate power (e.g., a battery charge) by receiving the energy harvesting waveform. For example, a transmitting device may transmit an energy harvesting waveform to the AIoT device 205. The transmitting device may not be aware of a location (e.g., in space) of the AIoT device 205 and may transmit a broad energy harvesting waveform (e.g., over a wide spatial area) to increase coverage of the energy harvesting waveform and increase a likelihood of the AIoT device 205 receiving the energy harvesting waveform. However, spreading the energy harvesting waveform over the spatial area may reduce a power (e.g., a received power) of the energy harvesting waveform, which may reduce performance (e.g., speed, efficiency) of energy harvesting procedures at the AIoT device 205.

Additionally, or alternatively, the transmitting device may fail to receive signaling from the AIoT device 205. In some examples, the AIoT device 205 may transmit a request to the transmitting device to initiate an energy management operation (e.g., an energy harvesting operation) for the AIoT device 205. The AIoT device 205 may be associated with a low device power. For example, the AIoT device 205 may be a low-complexity device associated with minimal power consumption and may transmit signaling (e.g., reference signals, pilot signals, beams) to the transmitting device with a low transmit power. However, the transmitting device may fail to receive the request from the AIoT device 205 because of the low transmit power of the request and may not initiate the energy harvesting operation. In some other examples, the AIoT device 205 may be dead (e.g., may have no power) and may not be capable of transmitting the request to the transmitting device. Accordingly, the transmitting device may not be aware that the AIoT device 205 is low on power and may not initiate the energy harvesting operation, which may delay or otherwise impede functionality of the AIoT device 205.

As described herein, devices within the wireless communications system 200 may perform energy management procedures based on the environment of the wireless communications system 200 and based on location information for the first AIoT device 205-*a* and the second AIoT device 205-*b*. In some examples, a transmitting device (e.g., a network entity 105, a nearby UE 115) may transmit a beamformed waveform 210 to the first AIoT device 205-*a* using the location information for the first AIoT device 205-*a*. The beamformed waveform 210 may be a sensing waveform, such as a FMCW waveform, an OFDM waveform, or another type of sensing waveform. By beamforming the sensing waveform, the transmitting device may transmit the beamformed waveform 210 to the first AIoT device 205-*a* with an increased transmission power.

The primary network entity 105-*a* may determine the location information for the first AIoT device 205-*a* and the second AIoT device 205-*b* using a digital twin model of the wireless communications system 200. The digital twin model may be a learning model (e.g., a machine learning model). In some examples, the primary network entity 105-*a* may perform one or more sensing procedures to build the learning model. For example, the primary network entity 105-*a* may provide sensing information obtained during the one or more sensing procedures as an input to the learning model, such as a location of an object 215.

Additionally, the primary network entity 105-*a* may obtain physical characteristic information about each AIoT device 205 and may provide the physical characteristic information as an input to the learning model. For example, the primary network entity 105-*a* may obtain dimensional information associated with the first AIoT device 205-*a* (e.g., a length, a width, a height) and may obtain dimensional information associated with the second AIoT device 205-*b* (e.g., a radius). The physical characteristic information may be preconfigured at the primary network entity. For example, an operator of each AIoT device 205 may define physical characteristics for a respective AIoT device 205 and may indicate the physical characteristics to the primary network entity 105-*a*. Based on the sensing information and the physical characteristic information, the learning model may determine and output the location information for each AIoT device 205, such as a distance associated with each AIoT device 205, an angle associated with each AIoT device 205, or both.

The primary network entity 105-*a* may determine whether to transmit the beamformed waveform 210 to the first AIoT device 205-*a* based on the location information. In the example of FIG. 2, the primary network entity 105-*a* may transmit the beamformed waveform 210 to the first AIoT device 205-*a*. In some other examples, the nearby network entity 105-*b*, the first nearby UE 115-*a*, the second nearby UE 115-*b*, the third nearby UE 115-*c*, or any combination thereof, may transmit the beamformed waveform 210 to the first AIoT device 205-*a*. In such examples, the primary network entity may request that the nearby network entity 105-*b*, the first nearby UE 115-*a*, the second nearby UE 115-*b*, the third nearby UE 115-*c*, or any combination thereof, transmits the beamformed waveform 210 based on the location information. The primary network entity 105-*a* may schedule resources (e.g., time resources, frequency resources, or both) for the primary network entity 105-*a*, the nearby network entity 105-*b*, the first nearby UE 115-*a*, the second nearby UE 115-*b*, the third nearby UE 115-*c*, or any combination thereof, for transmitting the beamformed waveform 210 based on the location information.

Additionally, the primary network entity 105-*a* may configure the beamformed waveform 210 based on the sensing information. The primary network entity 105-*a* may determine three-dimensional spatial information for the operating environment using the learning model. In accordance with the spatial information, the primary network entity 105-*a* may configure the beamformed waveform 210 to be transmitted directly or indirectly to the first AIoT device 205-*a*. For example, the primary network entity 105-*a* may configure the beamformed waveform 210 such that the beamformed waveform 210 is transmitted directly to the first AIoT device 205-*a* using line-of-sight (LOS) communications or such that the beamformed waveform 210 is indirectly transmitted to the first AIoT device 205-*a* using non-LOS communications. In some cases where the first AIoT device 205-*a* receives the beamformed waveform 210 indirectly, the primary network entity 105-*a* may determine, based on the spatial information, that LOS communications with the first AIoT device 205-*a* may be impeded or obstructed, and may instead transmit the beamformed waveform 210 such that the beamformed waveform 210 reflects off of an obstacle (e.g., the object 215) before being received by the first AIoT device 205-*a*.

In some examples, the first AIoT device 205-*a* may be dead (e.g., may be out of energy) and may be unable to transmit signaling to the primary network entity 105-*a*. For example, a battery of the first AIoT device 205-*a* may be depleted, and the first AIoT device 205-*a* may not have enough remaining power to transmit an energy harvesting operation request to the primary network entity 105-*a*. Alternatively, the first AIoT device 205-*a* may not have enough remaining power to respond to a query from the primary network entity 105-*a*.

In some cases as described herein, the primary network entity 105-*a* may transmit a beamformed waveform 210 to the first AIoT device 205-*a* for a duration, which may be preconfigured at the primary network entity 105-*a* or determined in accordance with the learning model. After the duration has elapsed, the primary network entity 105-*a* may transmit a query to the first AIoT device 205-*a*. The first AIoT device 205-*a* may receive the beamformed waveform 210 and may perform an energy harvesting operation to recharge (e.g., partially, fully) the first AIoT device 205-*a* (e.g., the battery of the first AIoT device 205-*a*). If the first AIoT device 205-*a* accumulates enough charge to operate, the first AIoT device 205-*a* may respond to the query from the primary network entity 105-*a* indicating a duration associated with the recharged first AIoT device 205-*a*, a duration associated with fully recharging the first AIoT device 205-*a*, a duration associated with recharging the first AIoT device 205-*a* to a threshold, or any combination thereof.

In some other cases as described herein, the primary network entity 105-*a* may not transmit the beamformed waveform 210 to the first AIoT device 205-*a*. Instead, the primary network entity 105-*a* may select another device within the wireless communications system 200 to transmit the beamformed waveform 210 to the first AIoT device 205-*a*, such as the nearby network entity 105-*b*, the first nearby UE 115-*a*, the second nearby UE 115-*b*, the third nearby UE 115-*c*, or any combination thereof. In some examples, the primary network entity 105-*a* may determine, based on the sensing information, that another device may perform more efficient energy harvesting operations with the first AIoT device 205-*a*.

For example, the primary network entity 105-*a* may determine that the first nearby UE 115-*a* is capable of transmitting the beamformed waveform 210 to the first AIoT device 205-*a* with a higher received signal strength indicator (RSSI). The primary network entity 105-*a* may transmit the request to the first nearby UE 115-*a* such that the first AIoT device 205-*a* may charge faster. In some other examples, the primary network entity 105-*a* may be occupied (e.g., in time, in frequency) serving other devices within the wireless communications system 200. In such examples, the primary network entity 105-*a* may request for another device to transmit the beamformed waveform 210, such as the first nearby UE 115-*a*. The primary network entity 105-*a* may request that multiple devices, including the nearby network entity 105-*b*, the first nearby UE 115-*a*, the second nearby UE 115-*b*, the third nearby UE 115-*c*, or any combination thereof, each transmit a beamformed waveform 210 to the first AIoT device 205-*a*.

In some examples where the first AIoT device 205-*a* is also a UE 115, the first AIoT device 205-*a* may transmit signaling associated with the beamformed waveform 210 to the transmitting device. For example, the first AIoT device 205-*a* may transmit a report indicating a signal strength of the beamformed waveform 210. If the first AIoT device 205-*a* detects a charging resource, such as the beamformed waveform 210, the first AIoT device 205-*a* may perform one or more measurements using the beamformed waveform 210 to determine the signal strength of the beamformed waveform 210. Additionally, the report may include an indication of a battery power (e.g., a battery level) of the first AIoT device 205-*a*. The first AIoT device 205-*a* may transmit the report periodically. Alternatively, the first AIoT device 205-*a* may be configured to transmit the report in response to one or more trigger conditions, including a change in the signal strength of the beamformed waveform 210, the signal strength of the beamformed waveform 210 satisfying a threshold, a change in the battery level of the first AIoT device 205-*a*, the battery level of the first AIoT device 205-*a* satisfying a threshold, or any combination thereof. In some cases, the first AIoT device 205-*a* may transmit the report via a dedicated carrier (e.g., via dedicated resources).

In some examples, the first AIoT device 205-*a* may refrain from transmitting (e.g., may skip transmitting, may not perform transmitting, may avoid transmitting) the report if the battery level of the first AIoT device 205-*a* satisfies (e.g., is above) a threshold. In some cases, the primary network entity 105-*a* may instruct the first AIoT device 205-*a* to refrain from transmitting (e.g., may skip transmitting, may not perform transmitting, may avoid transmitting) the report if the battery level is above the threshold. In some other cases, the first AIoT device 205-*a* may refrain from transmitting (e.g., may skip transmitting, may not perform transmitting, may avoid transmitting) the report if the battery level, an amount of energy charged using the beamformed waveform 210, or both, satisfies (e.g., is less than) a threshold value configured to the first AIoT device. The threshold value may be preconfigured or configured to the first AIoT device. Additionally, the first AIoT device 205-*a* may refrain from transmitting (e.g., may skip transmitting, may not perform transmitting, may avoid transmitting) the report if the signal strength of the beamformed waveform 210 is below a threshold. In such examples, because of the low power of the beamformed waveform 210 the first AIoT device 205-a may determine that a destination of the beamformed waveform 210 is not the first AIoT device 205-a.

The transmitting device may adjust a direction of the beamformed waveform 210 to improve the energy harvesting operation based on performing closed loop monitoring of the signal strength of the beamformed waveform 210. In some cases, the transmitting device may determine an initial direction of the beamformed waveform 210 based on the operating environment of the transmitting device, based on location information for the AIoT devices 205, or both. In the example, of FIG. 2, the primary network entity 105-a may determine the initial direction of the beamformed waveform 210 in accordance with the learning model. The transmitting device may adjust the direction of the beamformed waveform 210 to charge multiple AIoT devices 205 sequentially, to charge a group of AIoT devices 205 that may be collocated, or both.

In some examples, devices within the wireless communications system 200 may implement sensing procedures to assist in mobility management operations. For example, in FIG. 2, the first AIoT device 205-a may be moving. The primary network entity 105-a may determine one or more parameters associated with the first AIoT device based on one or more sensing procedures and in accordance with the learning model. For example, the primary network entity 105-a may be aware of a current power status of the first AIoT device 205-a, a power consumption rate of the first AIoT device 205-a, a power consumption associated with a report transmitted by the first AIoT device 205-a, a location of the first AIoT device 205-a, a velocity and a direction of the first AIoT device 205-a, a topology of the network, or any combination thereof. In some cases, the primary network entity 105-a may obtain the one or more parameters using the learning model. Based on the one or more parameters, the primary network entity 105-a may initiate an energy harvesting operation at the first AIoT device 205-a even if the first AIoT device 205-a is unlikely to experience a power outage (e.g., because the battery level of the first AIoT device 205-a is above a threshold).

In some examples where the first AIoT device 205-a is moving, the primary network entity 105-a may determine to combine (e.g., consolidate) multiple types of energy harvesting resources to improve robustness of energy harvesting operations for the first AIoT device 205-a. The primary network entity 105-a may detect energy harvesting resources present in the wireless communications system 200 based on one or more sensing procedures. For example, the energy harvesting resources may include solar energy, optical energy, electromagnetic signals, or any combination thereof. The primary network entity 105-a may provide information associated with the energy harvesting resources to the learning model (e.g., artificial intelligence (AI)/machine learning (ML)) to determine parameters for future energy harvesting operations performed prior to a handover of the first AIoT device 205-a. For example, the primary network entity may indicate solar energy harvesting information, including a time associated with a solar energy harvesting operation, a strength of the solar energy harvesting resource, or both.

The movement of the first AIoT device 205-a may trigger a handover event. In the example of FIG. 2, the first AIoT device 205-a may be moving. The first AIoT device 205-a may be served by a nearby UE 115, such as the first nearby UE 115-a. The primary network entity 105-a may use the learning model to determine (e.g., predict) that another nearby UE 115, such as the second nearby UE 115-b, may serve the first AIoT device 205-a better than the first nearby UE 115-a. For example, the primary network entity 105-a may determine that communications between the first AIoT device 205-a and the first nearby UE 115-a are obstructed (e.g., partially, fully) by an object 215. The primary network entity 105-a may indicate for the first AIoT device 205-a to switch service to the second nearby UE 115-b.

If the first AIoT device 205-a triggers the handover event, the primary network entity may determine updated parameters for energy harvesting operations performed after handover of the first AIoT device 205-a. For example, the primary network entity 105-a may determine a pool of resources for performing energy harvesting operations based on sensing procedures and in accordance with the learning model. The primary network entity 105-a may train (e.g., modify) the resource pool using sensing information obtained by the primary network entity 105-a, the nearby network entity 105-b, the nearby UEs 115, or any combination thereof.

Figure 3:
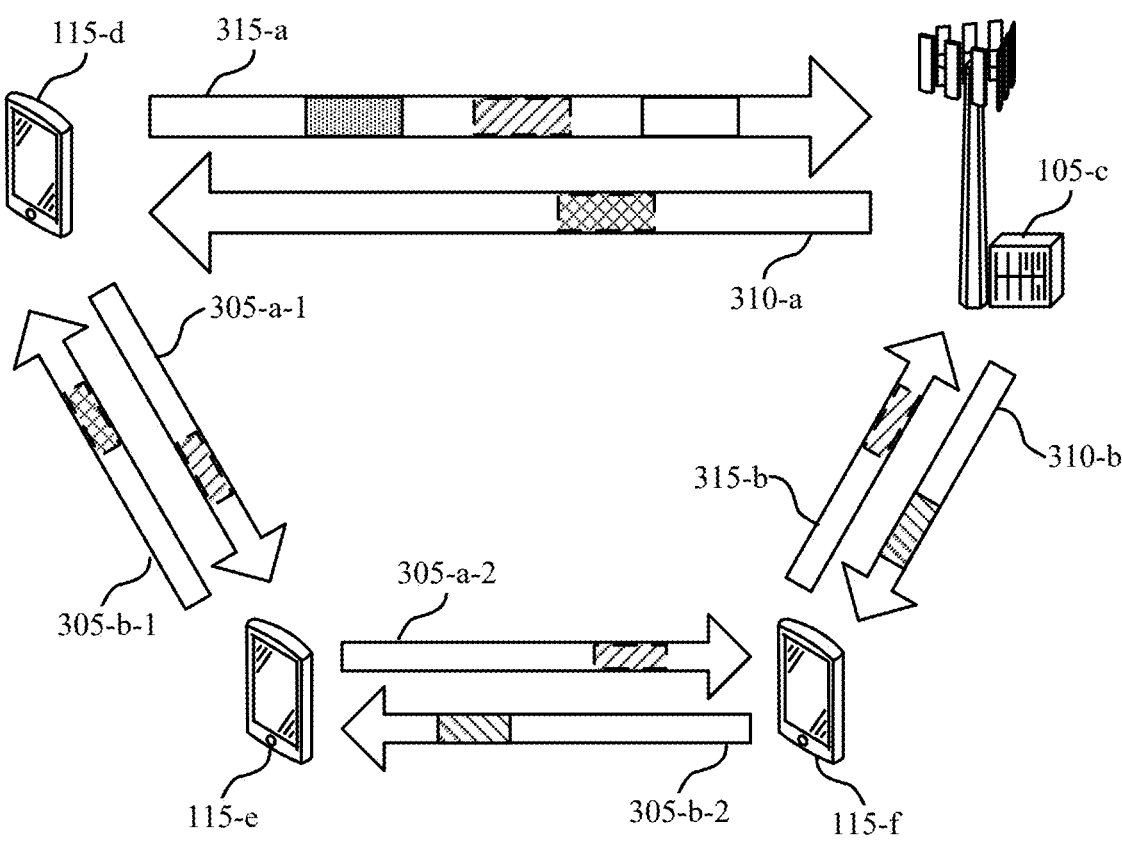
Figure 3:
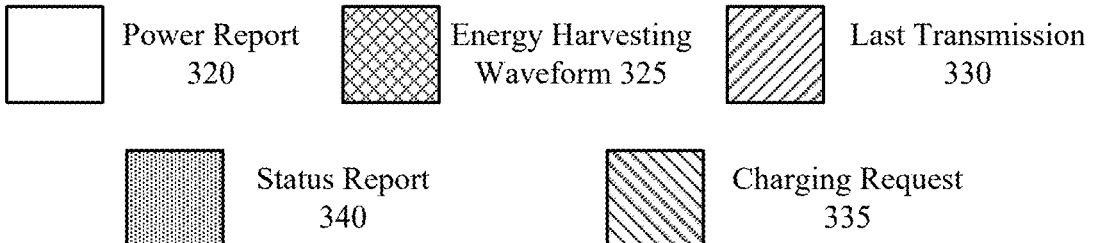

FIG. 3 shows an example of a wireless communications system 300 that supports sensing-based energy harvesting and management for ambient internet of things devices in accordance with one or more aspects of the present disclosure. The wireless communications system 300 may include a network entity 105-c, a target UE 115-d, a first nearby UE 115-e, and a second nearby UE 115-f, which may be examples of corresponding devices as described herein, including with reference to FIG. 1 and FIG. 2. In the example of FIG. 3, the target UE 115-d may be an AIoT device. In some cases, the first nearby UE 115-c, the second nearby UE 115-f, or both, may also be AIoT devices. The network entity 105-c may be a 6G device and may support performing sensing procedures as described herein with reference to FIG. 2. Additionally, one, both, or neither of the first nearby UE 115-e and the second nearby UE 115-f be support sensing procedures as described herein with reference to FIG. 2.

The target UE 115-d may communicate with at least one nearby UE 115 via a communication link. For example, the target UE 115-d may transmit signaling to the first nearby UE 115-e via sidelink 305-a-1 and may receive signaling from the first nearby UE 115-e via sidelink 305-b-1. Similarly, the nearby UEs 115 may communicate with other nearby UEs 115. For example, the first nearby UE 115-e may transmit signaling to the second nearby UE 115-f via sidelink 305-a-2 and may receive signaling from the first nearby UE 115-e via sidelink 305-b-2. The network entity 105-c may communicate with the target UE 115-d and at least one nearby UE 115 (e.g., the second nearby UE 115-f). Communications between the network entity 105-c and the UEs 115 may occur via cellular communication links. In the example of FIG. 3, the network entity 105-c may transmit signaling to the target UE 115-d via downlink 310-a, may transmit signaling to the second nearby UE 115-f via downlink 310-b, or both. Similarly, the network entity 105-c may receive signaling from the target UE 115-d via uplink 315-a, may receive signaling from the second nearby UE 115-f via uplink 315-b, or both. In some examples, the sidelinks 305, the downlinks 310, the uplinks 315, or any combination thereof, may support transmission of 6G signaling, such as a sensing waveform.

In some examples where the wireless communications system includes multiple UEs 115 that are AIoT devices, the UEs 115 may form a mesh network. For example, if the target UE 115-d, the first nearby UE 115-c, and the second nearby UE 115-f are all AIoT devices, the network entity 105-*c* may assist the UEs 115 in forming a mesh network. The network entity 105-*c* may be aware of information associated with each UE 115, including capability information, frequency band information, location information, or any combination thereof. The network entity 105-*c* may inform each UE 115 of adjacent UEs 115 and the capability information for each adjacent UE 115.

The network entity 105-*c* may be aware of information for each UE 115 based on the mesh network. However, the network entity 105-*c* and the UEs 115 may not be aware of an AIoT device within the wireless communications system 300 that is not a UE 115 (e.g., does not support one or more functionalities of a UE 115). Such an AIoT device may indicate information associated with the AIoT device (e.g., an identifier (ID) for the AIoT device, a distance) to the network entity 105-*c*. However, the AIoT device may not be aware of location information associated with the AIoT device, and as such may not be able to inform the network entity 105-*c* of location information for the AIoT device.

In the example of FIG. 3, it may be beneficial to perform an energy harvesting operation for the target UE 115-*d*. For example, a battery level of the target UE 115-*d* may be partially depleted (e.g., below a threshold). In such examples, the network entity 105-*c* may schedule resources for performing energy harvesting operations for the target UE 115-*d*. The network entity 105-*c* may perform sensing procedures to determine information about the surrounding environment (e.g., sensing information). The network entity 105-*c* may build a learning model using the sensing information. As described with reference to FIG. 2, the network entity 105-*c* may determine location information about the UEs 115 (e.g., based on a sensing procedure, based on receiving the information from a UE 115) and may provide such information as an input to the learning model. The network entity 105-*c* may determine location information for the UEs 115 and any AIoT device within the wireless communications system 300 based on the sensing information. The learning model may also output an indication of the operating environment, including location information associated with objects (e.g., walls, shelves), to the network entity 105-*c* based on the sensing information.

The network entity 105-*c* may be aware of scheduling information and capability information for each UE 115. The scheduling information may include current time and frequency resource scheduling and future (e.g., upcoming) time and frequency resource scheduling. The capability information may include a beamforming capability of each UE 115, an energy capability of each UE 115, or both. In some cases, the network entity 105-*c* may obtain the scheduling information and the capability information via the mesh network. Alternatively, the network entity 105-*c* may receive the information (e.g., from the UEs 115). The network entity 105-*c* may additionally be aware of information associated with each AIoT device (e.g., the target UE 115-*d*), including a remaining battery level for each AIoT device and an expected application associated with each AIoT device. The network entity may associate each AIoT device with a priority for data communications and a priority for energy harvesting operations based on the expected application.

As described herein, the network entity 105-*c* may implement smart resource management to determine when a communication channel is being used, how the communication channel is being used, or both. For example, the communication channel may be associated with a mode, including communicating 6G data, transmitting sensing waveforms, communicating signaling (e.g., a query, a command) with an AIoT device, transmitting energy management waveforms, or any combination thereof. The network entity 105-*c* may select time and frequency resources for the communication channel in accordance with the mode. Additionally, the network entity 105-*c* may determine whether an anchoring device (e.g., the first nearby UE 115-*e*, the second nearby UE 115-*f*) or the network entity 105-*c* may use the communication channel in accordance with the mode. In some cases, the network entity 105-*c* may determine that the communication channel is shared with between multiple RF transmitters (e.g., the network entity 105-*c*, the first nearby UE 115-*c*, the second nearby UE 115-*f*). By sharing the communication channel, the RF transmitters may simultaneously perform data transmission (e.g., 6G data, AIoT signaling) and an energy harvesting operation.

The network entity 105-*c* and the UEs 115 may perform sensing procedures to determine environmental information about an operating environment of the wireless communications system 300. In some examples, the network entity 105-*c* and the UEs 115 may use multiple streams of information to determine the environmental information. For example, the network entity 105-*c* may employ optical or visual sensing (e.g., may use a camera) to detect whether a propagation channel of the wireless communications system 300 is blocked or includes reflection. Additionally, or alternatively, the network entity 105-*c* may determine the presence of solar energy and a strength of the solar energy using optical sensing. The network entity 105-*c* may employ both optical sensing and radio sensing (e.g., a sensing procedure) to build a three-dimensional model of the operating environment.

Based on the sensing procedures, the network entity 105-*c* may identify the first nearby UE 115-*e* and the second nearby UE 115-*f*. The network entity 105-*c* may determine that one, both, or none of the first nearby UE 115-*e* and the second nearby UE 115-*f* supports energy harvesting operations. For example, the network entity 105-*c* may determine that the first nearby UE 115-*c* and the second nearby UE 115-*f* are capable of transmitting an energy management waveform to the target UE 115-*d*. The network entity may also determine that the first nearby UE 115-*e* and the second nearby UE 115-*f* are capable of receiving, decoding, and relaying signaling from the target UE 115-*d*. Additional details regarding determining capabilities of the nearby UEs 115 are described in further detail with respect to FIG. 4.

The network entity 105-*c* may also receive signaling from the target UE 115-*d* indicating power information for the target UE 115-*d*. For example, the target UE 115-*d* may transmit a power report 320 to the network entity 105-*c* indicating a battery status (e.g., a battery level) of the target UE 115-*d*, a power consumption rate of the target UE 115-*d*, or both. In the example of FIG. 3, the network entity 105-*c* may receive the signaling via the uplink 315-*a*. The target UE 115-*d* may transmit additional signaling to the network entity 105-*c*. For example, the target UE 115-*d* may transmit a power request message requesting an energy harvesting operation for the target UE 115-*d*. In some cases, the target UE 115-*d* may transmit the power request message if the battery level of the target UE 115-*d* drops below a threshold.

In some examples, the network entity 105-*c* may initiate an energy harvesting operation for the target UE 115-*d* based on the sensing procedures. For example, the network entity 105-*c* may observe the target UE 115-*d* and determine that the target UE 115-*d* has missed (e.g., failed to transmit) at least one report (e.g., a power report 320). The network entity 105-*c* may configure an energy harvesting waveform 325 (e.g., an energy management waveform). In some examples, the energy harvesting waveform 325 may be a 6G sensing waveform (e.g., FMCW waveform, OFDM waveform). In some examples, the network entity 105-c may configure a plurality of sensing waveforms, each associated with a capability level for energy harvesting. For example, FMCW waveforms may be associated with a higher power density relative to other sensing waveforms, and the network entity 105-c may configure the energy harvesting waveform 325 as a FMCW waveform. Each energy harvesting waveform 325 may have a different frequency, a different modulation scheme, or both. Additionally, each energy harvesting waveform 325 may be a same type of waveform, or may be different types of waveforms.

The network entity 105-c may determine a strategy for the energy harvesting operation for the target UE 115-d based on the sensing procedures. For example, the network entity 105-c may determine whether to transmit the energy harvesting waveform 325 to the target UE 115-d directly, or whether to request one of the first nearby UE 115-e, the second nearby UE 115-f, or both to transmit the energy harvesting waveform 325 to the target UE 115-d. Additionally, the network entity may also configure the target UE 115-d based on the sensing procedures and capability information for the target UE 115-d. For example, if the network entity 105-c determines (e.g., senses) that the target UE 115-d is capable of communications in multiple frequency bands, the network entity 105-c may mandate (e.g., instruct, configure) the target UE 115-d to transmit signaling via a specific frequency band. The network entity 105-c may configure power resources for the target UE 115-d, including a modulation and coding scheme.

In some other examples, the target UE 115-d may initiate the energy harvesting operation at the target UE 115-d. For example, the target UE 115-d may transmit a last transmission 330 indicating a request for the energy harvesting operation at the target UE 115-d. The last transmission 330 may be identifiable by a marking or identifier (ID) associated with the last transmission 330. In some examples, the target UE 115-d may not transmit additional signaling (e.g., to the network entity 105-c, to the first nearby UE 115-e) after transmitting the last transmission 330. For example, the last transmission 330 may be a power request or a last report (e.g., a power report 320), and the target UE 115-d may refrain from transmitting (e.g., may skip transmitting, may not perform transmitting, may avoid transmitting) additional signaling to preserve the remaining battery level of the target UE 115-d. The network entity 105-c may receive the last transmission 330 and may provide the last transmission 330 as an input to the learning model to determine parameters for executing (e.g., performing) the energy harvesting operation for the target UE 115-d and predicting future energy harvesting operations.

In some cases, the target UE 115-d may transmit the last transmission 330 to a nearby UE 115. Based on performing a sensing procedure, on receiving an indication from the network entity 105-c, the first nearby UE 115-e, the second nearby UE 115-f, or any combination thereof, or both, the target UE 115-d may be aware of a proximity of the target UE 115-d to the other UEs 115, including the first nearby UE 115-e and the second nearby UE 115-f. In the example of FIG. 3, the target UE 115-d may determine that the first nearby UE 115-e is closest to the target UE 115-d and may transmit the last transmission 330 to the first nearby UE 115-e using peer-to-peer communications, such as via sidelink 305-a-1 or via another channel.

The first nearby UE 115-e may relay the last transmission 330 to another device based on scheduling from the network entity 105-c. In the example of FIG. 3, the first nearby UE 115-e may relay the last transmission 330 to the second nearby UE 115-f via the sidelink 305-a-2. In some other examples, if the first nearby UE 115-e is in communications with the network entity 105-c, it may relay the last transmission 330 to the network entity 105-c. Similarly, in the example of FIG. 3, the second nearby UE 115-f may relay the last transmission 330 to the network entity 105-c via the uplink 315-b. In some other examples, the second nearby UE 115-f may relay the last transmission 330 to another nearby UE 115 (not shown) via a sidelink 305. The first nearby UE 115-e and the second nearby UE 115-f may receive scheduling from the network entity 105-c indicating relay behavior for the first nearby UE 115-e and the second nearby UE 115-f.

In some other cases, the target UE 115-d may transmit the last transmission 330 directly to the network entity 105-c. In the example of FIG. 3, the target UE 115-d may transmit the last transmission 330 to the network entity 105-c via the uplink 315-a. In such cases, the network entity 105-c may schedule one or more nearby UEs 115 to monitor a resource to detect the last transmission 330. For example, the network entity 105-c may schedule the second nearby UE 115-f to monitor the uplink 315-a for the last transmission 330. If the second nearby UE 115-f detects the last transmission on the uplink 315-a, the second nearby UE 115-f may query (e.g., transmit a query to) the network entity 105-c to determine whether the network entity 105-c received the last transmission 330 from the target UE 115-d. If the network entity 105-c responds to the query indicating that it has not received the last transmission 330, the second nearby UE 115-f may decode the last transmission 330 and may transmit the decoded last transmission 330 to the network entity 105-c to ensure that the network entity 105-c receives an indication of the request for the energy harvesting operation for the target UE 115-d.

The network entity 105-c may instruct the target UE 115-d, the first nearby UE 115-e, the second nearby UE 115-f, or any combination thereof, based on the sensing procedures and based on updated sensing information associated with the UEs 115. For example, based on the sensing procedures, the network entity 105-c may instruct the target UE 115-d to transmit the last transmission 330 to the network entity 105-c or to the first nearby UE 115-e. The network entity 105-c may also instruct the first nearby UE 115-e, the second nearby UE 115-f, or both to monitor the target UE 115-d and the uplink 315-a to determine whether the network entity 105-c has received the last transmission 330.

In some other cases, the network entity 105-c may request multiple UEs 115 to perform the energy harvesting operation for the target UE 115-d. For example, the network entity 105-c may request both the first nearby UE 115-e and the second nearby UE 115-f transmit energy harvesting waveforms 325 to the target UE 115-d. The network entity 105-c may schedule beamforming for each nearby UE 115. In some examples, the network entity 105-c may implement a feedback loop to enable beamforming for the multiple UEs 115. At a time slot 0 (e.g., a first time slot), multiple nearby UEs 115 may simultaneously transmit energy harvesting waveforms 325 to the target UE 115-d. At a time slot 1 (e.g., a second time slot), the target UE 115-d may transmit the last transmission 330 to the network entity 105-c. At a time slot 2 (e.g., a third time slot), the network entity 105-c may receive the last transmission 330 and based on the last transmission 330, may coordinate a subset of the nearby UEs 115 to perform beamforming (e.g., coherent beamforming) to transmit the energy harvesting waveforms 325. For example, the network entity 105-c may indicate for the first nearby UE 115-e or the second nearby UE 115-f to beamform the energy harvesting waveform 325. The network entity 105-c may receive a second last transmission 330 (e.g., at a later time) and may update the coordination (e.g., the subset of the nearby UEs 115).

In some examples, the network entity 105-c may authorize a nearby UE 115 to locally respond to the last transmission 330 from the target UE 115-d. For example, the network entity 105-c may indicate that the first nearby UE 115-e may transmit the energy harvesting waveform 325 to the target UE 115-d based on receiving the last transmission 330. The first nearby UE 115-e may autonomously determine a set of parameters associated with the energy harvesting waveform 325, including frequencies, modulation schemes, beam directions, or any combination thereof, and may transmit the energy harvesting waveform 325 in accordance with the set of parameters.

Additionally, the network entity 105-c may determine a strategy for performing the energy harvesting operation for the target UE 115-d based on the last transmission 330. In some examples, if the network entity 105-c receives the last transmission 330 directly from the target UE 115-d, the network entity 105-c may check whether communication resources associated with transmitting the energy harvesting waveform 325 are available. If the communication resources are available, the network entity 105-c may form (e.g., beamform) the energy harvesting waveform 325 and transmit the energy harvesting waveform directly to the target UE 115-d.

In some other examples, if the network entity 105-c receives the last transmission 330 from a nearby UE 115 (e.g., the first nearby UE 115-c, the second nearby UE 115-f), the network entity 105-c may request that the nearby UE 115 or another nearby UE 115 serve the target UE 115-d (e.g., perform the energy harvesting operation). In the example of FIG. 3, the network entity 105-c may transmit a charging request 335 to the second nearby UE 115-f indicating for the second nearby UE 115-f to transmit the energy harvesting waveform 325. In some cases, the charging request 335 may indicate for the first nearby UE 115-e to transmit the energy harvesting waveform 325, and the second nearby UE 115-f may relay the charging request 335 to the first nearby UE 115-c.

The network entity 105-c may select resources for transmitting the energy harvesting waveform 325 to the target UE 115-d based on the sensing procedures. For example, the network entity may select a frequency for the energy harvesting waveform 325 based on the sensing and may indicate the frequency to nearby UE 115 via the charging request 335. In some cases, if the network entity 105-c determines that the propagation channel associated with the energy harvesting waveform 325 is blocked (e.g., partially obstructed, fully obstructed), the network entity 105-c may select low frequency resources associated with a higher diffraction property relative to high frequency resources. In some other cases, if the network entity 105-c determines that the propagation channel is clear (e.g., there is LOS), the network entity 105-c may select high frequency resources.

In some cases, the target UE 115-d may request that a nearby UE 115 (e.g., the first nearby UE 115-e) relay the last transmission 330 to the network entity 105-c. If the relay fails, the target UE 115-d may initiate a direct uplink transmission with the first nearby UE 115-e using a preconfigured uplink resource. The preconfigured uplink resource may be defined in accordance with sidelink communication protocols. The target UE 115-d may initiate the uplink transmission based on the remaining battery level of the target UE 115-d. For example, the target UE 115-d may initiate the uplink transmission if the remaining battery level of the target UE 115-d satisfies a threshold.

The target UE 115-d may receive one or more energy harvesting waveforms 325 from the network entity 105-c, the first nearby UE 115-e, the second nearby UE 115-f, or any combination thereof, in accordance with an energy harvesting operation. In some examples, the target UE 115-d may charge the target UE 115-d (e.g., a battery of the target UE 115-d) using the one or more energy harvesting waveforms 325. For example, the target UE 115-d may receive the one or more energy harvesting waveform 325 using an energy harvesting circuit of the target UE 115-d. The energy harvesting circuit may include a rectifier, and the target UE 115-d may provide the energy harvesting waveform 325 as an input to the rectifier. The rectifier may convert the energy harvesting waveform 325 into a direct current (DC) signal. The energy harvesting circuit may interface with (e.g., may be coupled with) a power system of the target UE 115-d. For example, the power system may include one or more boost converters coupled with a power management unit of the target UE 115-d. The one or more boost converters may interface with the rectifier and receive an output of the rectifier. For example, the one or more boost converters may receive the DC signal and may increase a voltage of the DC signal. The one or more boost converters may transmit the DC signal to the power management unit, which may charge the battery of the target UE 115-d.

After the battery of the target UE 115-d is recharged (e.g., fully, to a threshold level), the target UE 115-d may transmit a status report 340 to the network entity 105-c indicating a status of the target UE 115-d. For example, the status report 340 may indicate the battery level of the target UE 115-d after the energy harvesting operation. Additionally, the status report 340 may indicate to the network entity 105-c that the target UE 115-d has enough energy to perform communications. In some cases, the target UE 115-d may transmit the status report 340 based on receiving a request from the network entity 105-c.

Figure 4:
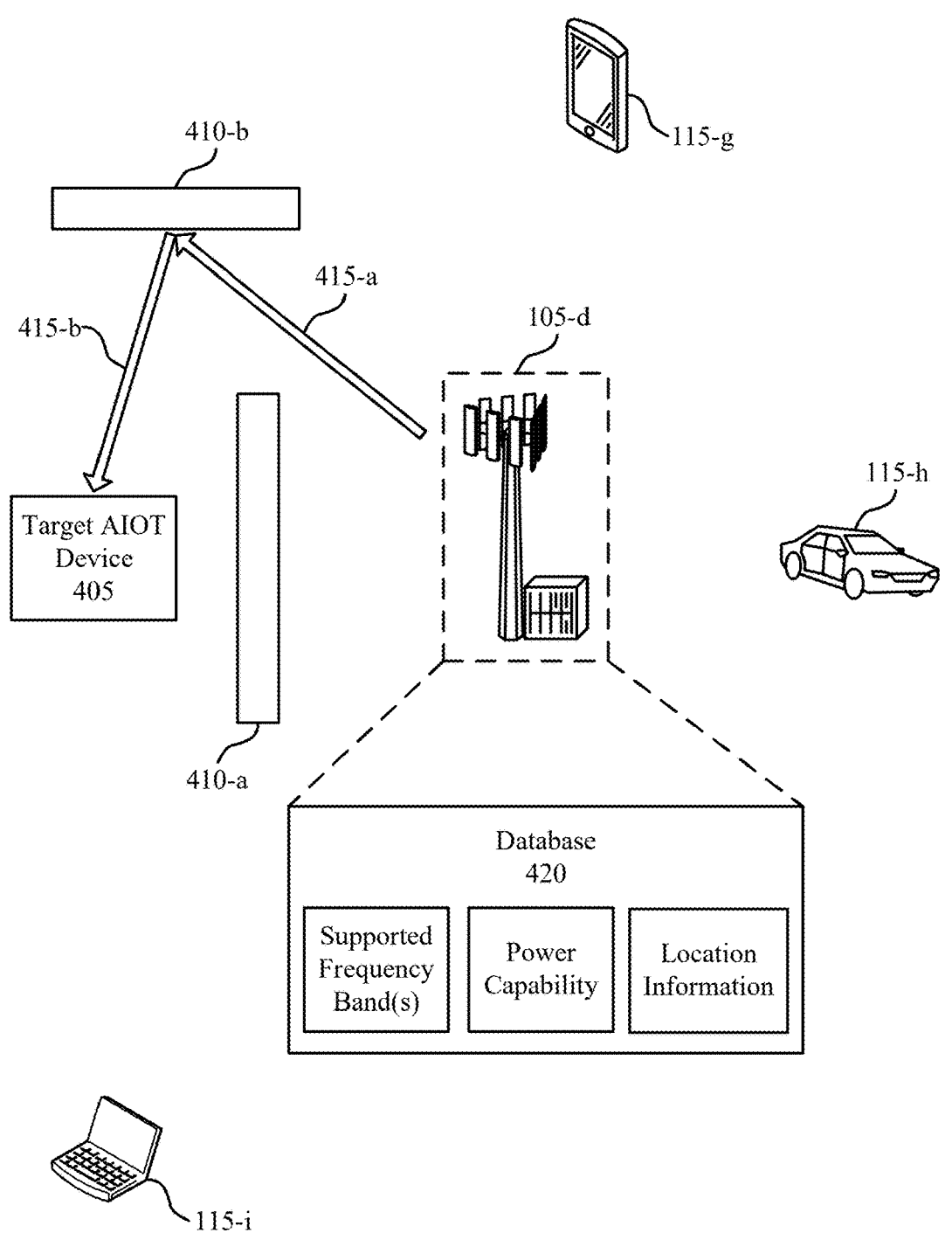

FIG. 4 shows an example of a wireless communications system 400 that supports sensing-based energy harvesting and management for ambient internet of things devices in accordance with one or more aspects of the present disclosure. The wireless communications system 400 may include a network entity 105-d, a first nearby UE 115-g, a second nearby UE 115-h, a third nearby UE 115-i, and a target AIoT device 405, which may be examples of corresponding devices as described herein, including with reference to FIG. 1, FIG. 2, and FIG. 3. In some examples, the wireless communications system may also include one or more obstacles, such as a first object 410-a and a second object 410-b. In the example of FIG. 4, the first nearby UE 115-g may be an example of a cellular phone, the second nearby UE 115-h may be an example of a vehicle, and the third nearby UE 115-i may be an example of a computer (e.g., a tablet computer, a laptop computer, a personal computer).

In some examples, the network entity 105-d may be aware of an operating environment of the wireless communications system 400 based on a sensing procedure performed by the network entity 105-d, in accordance with a learning model, or both. For example, the network entity 105-d may determine that a LOS between the network entity and the target AIoT device 405 is blocked (e.g., partially obstructed, fully obstructed) by a first obstacle (e.g., the first object 410-a). Accordingly, the network entity 105-d may not be able to transmit an energy harvesting beam 415-a directly (e.g., via a LOS) to the target AIoT device 405. Instead, the network entity 105-*d* may configure the energy harvesting beam 415-*a* such that the energy harvesting beam 415-*a* is reflected off of a second obstacle (e.g., the second object 410-*b*). The target AIoT device 405 may receive a reflected beam 415-*b* and may perform an energy harvesting operation to charge the target AIoT device using the reflected beam 415-*b*.

The network entity 105-*d* and the nearby UEs 115, or both, may periodically perform sensing to maintain updated location information for each device within the wireless communications system 400. For example, the network entity 105-*d* may perform periodic sensing to determine a digital map of the operating environment of the wireless communications system 400 and to track changes in the locations of objects 410 and devices within the wireless communications system 400. The network entity may determine a periodicity for performing the sensing procedures based on receiving updated location information from a nearby UE 115, based on receiving a report (e.g., an updated report) from the target AIoT device 405, or both.

Each nearby UE 115 may be associated with an energy management (e.g., power boosting) capability and a decoding capability. The network entity 105-*d* may be aware of the capabilities of each UE 115 in communications with the network entity 105-*d*. For example, the network entity 105-*d* may maintain a database 420 storing information for each UE 115 within a coverage area (not shown) of the network entity 105-*d*. In some examples, the database 420 may store information associated with supported frequency bands for each UE 115 and power capability information for each UE 115. Additionally, based on the sensing procedure, the network entity 105-*d* may be aware of location information for each UE 115. The network entity 105-*d* may classify each nearby UE 115 in accordance with Table 1. For example, the network entity 105-*d* may determine whether each UE 115 is decode-capable and power-boosting capable.

TABLE 1

| UE decoding capability matrix | | |
| --- | --- | --- |
| | Decode-capable | Decode-incapable |
| Power-boosting capable | Dual-capable | Power-boosting capable |
| Power-boosting incapable | Decode-capable | None-capable |

If a nearby UE 115 is decode-capable (e.g., is a reader UE 115), the nearby UE 115 may be able to decode signaling received from the target AIoT device 405, including a last transmission (e.g., a power request, a last report) from the target AIoT device 405. The network entity 105-*d* may request (e.g., directly) for the nearby UE 115 to transmit the last transmission to the network entity 105-*d*. If a nearby UE 115 is power-boosting capable (e.g., supports transmitting RF waveforms for energy harvesting), the network entity 105-*d* may request for the nearby UE 115 to perform an energy harvesting operation for the target AIoT device 405. The network entity 105-*d* may request the energy harvesting operation from the nearby UE 115 based on the supported frequency band and power capability information for the nearby UE 115. For example, the network entity 105-*d* may transmit the request if the nearby UE 115 supports a frequency band associated with the target AIoT device 405 and if the nearby UE 115 has enough power (e.g., battery level is above a threshold) to perform the energy harvesting operation. In some examples, the network entity 105-*d* may determine that a nearby UE 115 is dual-capable if the nearby UE 115 is both decode-capable and power-boosting capable. Alternatively, the network entity 105-*d* may determine that a nearby UE 115 is none-capable if the nearby UE 115 is neither decode-capable nor power-boosting capable. In the example of FIG. 4, the first nearby UE 115-*g* may be an example of a dual-capable UE 115, the second nearby UE 115-*h* may be an example of a power-boosting capable UE 115, and the third nearby UE 115-*i* may be an example of a decode-capable UE 115.

Additionally, in some examples where the target AIoT device 405 is a UE 115 (e.g., is an AIoT UE 115), the network entity 105-*d* may classify a decode-capability of the target AIoT device 405 in accordance with Table 1. If the target AIoT device 405 is decode-capable, the network entity 105-*d* may implement sensing (e.g., 6G RF sensing) directly with the target AIoT device 405 to determine accurate location information for the target AIoT device 405. If the target AIoT device 405 is not decode-capable (e.g., the target AIoT device 405 is passive), the network entity 105-*d* may determine location information for the target AIoT device 405 using sensing (e.g., the sensing procedure, the database 420). For example, the network entity 105-*d* may employ both visual sensing (e.g., a camera) and RF sensing to determine a location of the target AIoT device 405 in accordance with examples described herein, including with reference to FIG. 3.

After determining the location of the target AIoT device 405, the network entity 105-*d* may perform an energy harvesting operation with the target AIoT device 405 directly, or may locate a power-boosting capable nearby UE 115 to perform the energy harvesting operation with the target AIoT device 405. If the network entity 105-*d* determines that no nearby UE 115 is capable of performing the energy harvesting operation, the network entity 105-*d* may request multiple nearby UEs 115 to beamform an energy harvesting waveform to the target AIoT device 405. Additionally, the network entity 105-*d* may increase a transmission power associated with the target AIoT device 405 and implement beamforming to focus energy (e.g., an energy harvesting waveform) to the target AIoT device 405. If the network entity 105-*d* requests multiple nearby UEs 115 to perform the energy harvesting operation, the network entity 105-*d* may increase a transmission power for each nearby UEs 115 based on a capability (e.g., the power capability) of each nearby UE 115.

In some examples, the network entity 105-*d* may use knowledge of the operating environment obtained using the learning model to determine a non-line of sight (NLOS) angle for the energy harvesting beam 415-*a*. For example, the network entity 105-*d* may configure the energy harvesting beam 415-*a* such that the energy harvesting beam 415-*a* is reflected off of the second object 410-*b* to the target AIoT device 405. The network entity 105-*d* may configure similar energy harvesting waveforms transmitted by the nearby UEs 115 such that they are reflected off of an obstacle before being received by the target AIoT device 405.

The network entity 105-*d* may instruct each nearby UE 115 based on the capabilities of each nearby UE 115. In some examples, the network entity 105-*d* may determine a strategy for performing energy harvesting operations for each nearby UE 115 in accordance with Table 2. For example, the network entity 105-*d* may customize the strategy for each nearby UE 115 based on the capabilities of each nearby UE 115.

TABLE 2

| UE response strategies | |
|---|---|
| Nearby UE Capability | Action taken by the Nearby UE |
| None-capable | None |
| Power-boosting capable | Power boost the target AIoT device 405 directly based on network entity 105-d command |
| Decode-capable | Relay signaling from the target AIoT device 405 to the network entity 105-d |
| Dual-capable | Perform direct power boosting or relay signaling |

If a nearby UE 115 is classified as power-boosting capable, the nearby UE 115 may transmit an energy harvesting waveform to the target AIoT device 405. In some examples, if the nearby UE 115 is classified as power-boosting capable, the network entity 105-d may transmit a request for the nearby UE 115 to perform an energy harvesting operation for the target AIoT device 405. The nearby UE 115 may receive the request and may transmit an energy harvesting waveform (e.g., a sensing waveform) to the target AIoT device 405. The nearby UE 115 may receive the request from the network entity 105-d or from another nearby UE 115. (e.g., may be relayed the request from another nearby UE 115). In some cases, the nearby UE 115 may transmit the energy harvesting waveform together with one or more additional nearby UEs 115, with the network entity 105-d, or both. The nearby UE 115 may transmit a report to the network entity 105-d indicating the power-boosting capability of the nearby UE 115. For example, the nearby UE 115 may indicate a capability to perform full boosting of the target AIoT device 405, partial boosting of the target AIoT device 405, or may indicate that the nearby UE 115 is not power-boosting capable.

If a nearby UE 115 is classified as decode-capable, the nearby UE 115 may receive and relay signaling from the target AIoT device 405. In some examples, the nearby UE 115 may receive a message from the target AIoT device 405 indicating a request for an energy harvest operation for the target AIoT device 405. The message may be a last transmission from the target AIoT device, such as a power request message or a last report. The nearby UE 115 may relay (e.g., transmit) the message to another nearby UE 115 or to the network entity 105-d based on scheduling received from the network entity 105-d. If the nearby UE 115 is classified as decode-capable, the nearby UE 115 may drop any signaling received from the network entity 105-d requesting the nearby UE 115 to perform the energy harvesting operation for the target AIoT device 405.

If a nearby UE 115 is classified as dual-capable, it may receive and relay signaling from the target AIoT device 405 and may transmit an energy harvesting waveform to the target AIoT device 405 as part of an energy harvesting operation. If a nearby UE 115 is classified as none-capable, the nearby UE 115 may be unable to decode signaling from the target AIoT device 405 and may be unable to transmit energy harvesting waveforms to the target AIoT device 405. Accordingly, the network entity 105-d may instruct the nearby UE 115 to drop any requests to perform energy harvesting operations received from the network entity 105-d and any requests to relay signaling received from the target AIoT device 405.

In some cases, the capabilities described in Table 1 may be determined in accordance with a learning model. In one example, the network entity 105-d may implement a supervised learning model, which may define (e.g., pre-define)

four types (e.g., labels) of capability. In another example, the network entity 105-d may implement a non-supervised learning model, which may follow the digital twin learning model at the network entity 105-d. The non-supervised learning model may converge to a quantity N clusters of capabilities in a hyperlocal scenario, such as the wireless communications system 400.

In some examples where the network entity 105-d implements the non-supervised learning model, the network entity 105-d may periodically request each nearby UE 115 within the learning model to perform energy harvesting operations during a training phase of the learning model. The network entity may periodically request each nearby UE 115 during the training phase to observe behaviors of each nearby UE 115. After the training phase is completed (e.g., the digital twin model is built), the learning model may identify a quantity N clusters associated with the behaviors of each nearby UE 115 observed during the training phase. The learning model may not label the N clusters.

Figure 5:
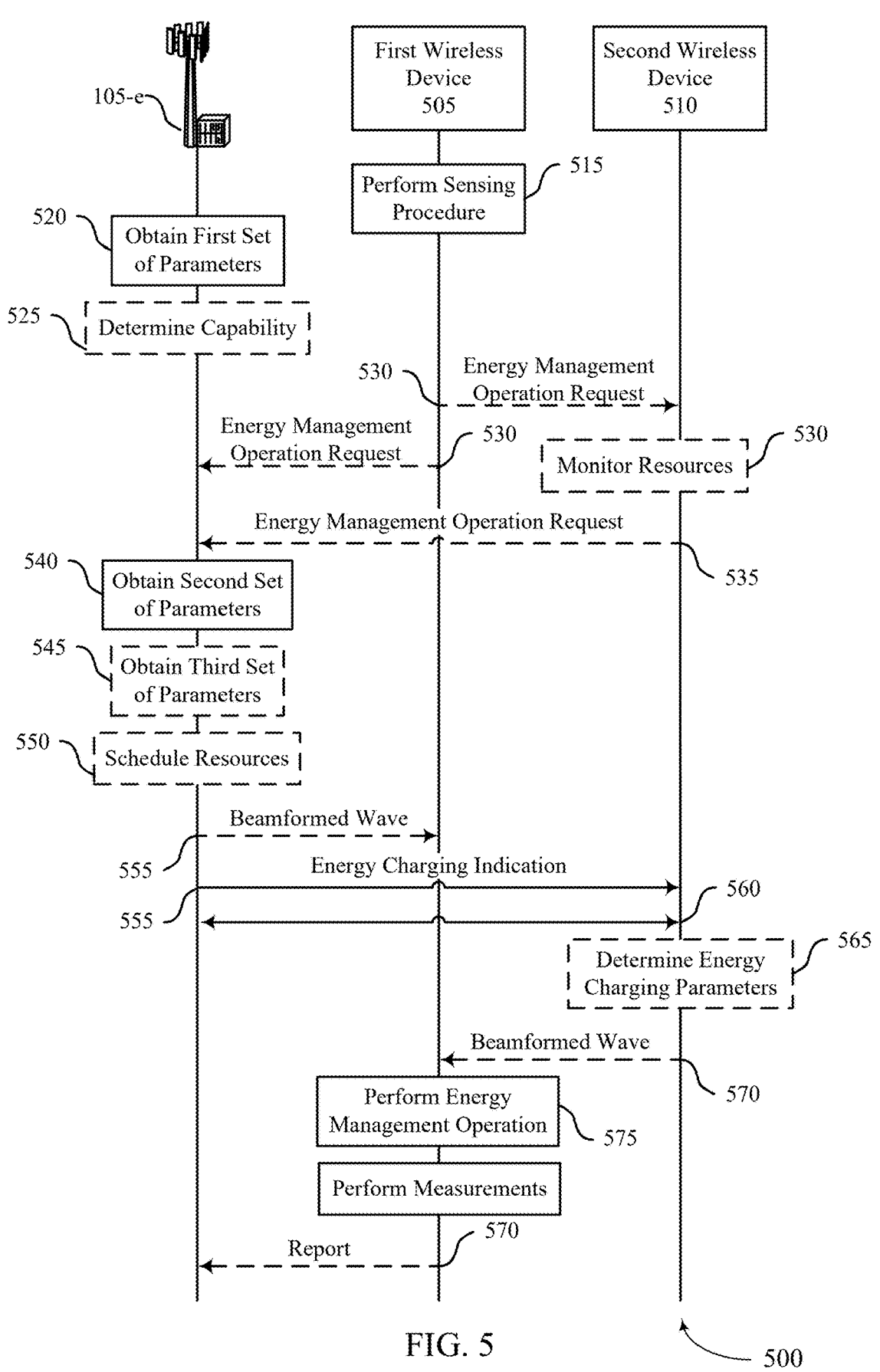
FIG. 5 shows an example of a process flow that supports sensing-based energy harvesting and management for ambient internet of things devices in accordance with one or more aspects of the present disclosure.

FIG. 5 shows an example of a process flow 500 that supports sensing-based energy harvesting and management for ambient internet of things devices in accordance with one or more aspects of the present disclosure. The process flow 500 may implement or be implemented by aspects of the wireless communications system 100, the wireless communications system 200, the wireless communications system 200, and the wireless communications system 200, as described with reference to FIGS. 1, 2, 3, and 4. For example, the process flow 500 illustrates actions performed by a network entity 105-e, a first wireless device 505, and a second wireless device 510, which may be examples of corresponding devices described herein, including with reference to FIGS. 1-4. In the following description of the process flow 500, the operations between the network entity 105-e, the first wireless device 505, and the second wireless device 510 may be performed in a different order than the example shown, or the operations between the network entity 105-e, the first wireless device 505, and the second wireless device 510 may be performed in different orders at different times. Some operations may also be omitted from the process flow 500, and other operations may be added to the process flow 500.

The first wireless device 505 may be an AIoT device (e.g., a first AIoT device 205-a as described with reference to FIG. 1, a target AIoT device 405 as described with reference to FIG. 4). In some examples, the first wireless device may also be an example of a UE (e.g., a target UE 115-d as described with reference to FIG. 3). The second wireless device 510 may also be an example of a UE (e.g., a nearby UE 115 as described with reference to FIGS. 2-4).

At 515, the first wireless device 505 may perform a sensing procedure. For example, the first wireless device may transmit a sensing waveform to determine information about an operational environment of the first wireless device

505. In some examples, the first wireless device 505 may be a 6G device, and may support transmitting FMCW waveforms, OFDM waveforms, or other types of sensing waveforms for performing the sensing procedure.

At 520, the network entity 105-*e* may obtain a first set of one or more parameters associated with at least one first wireless device 505 based at least in part on a sensing procedure. In some examples, the network entity may perform the sensing procedure to obtain the one or more parameters. Additionally, or alternatively, the network entity 105-*e* may obtain the first set of one or more parameters based at least in part on a sensing operation performed by at least one first wireless device 505. At 525, the network entity 105-*e* may determine a capability of at least one second wireless device 510 based at least in part on the sensing procedure.

At 530, the first wireless device 505 may transmit signaling to one or more of the network entity 105-*e* or at least one second wireless device 510 based at least in part on the sensing procedure, the signaling indicating a request for an energy management operation. The signaling may comprise a last report message or a power request message. In some examples, at 530, the second wireless device 510 may receive signaling from the at least one first wireless device 505. Additionally, or alternatively, the second wireless device 510 may monitor resources for signaling from the at least one first wireless device 505 to the network entity 105-*e* in accordance with a request from the network entity 105-*e* to monitor the at least one first wireless device 505.

At 535, the second wireless device 510 may relay the signaling from the at least one first wireless device 505 to the network entity 105-*e* in accordance with the capability of the second wireless device 510. In some examples, the second wireless device 510 may relay the signaling to the network entity 105-*e* based at least in part on determining that the network entity 105-*e* failed to receive the signaling from the at least one first wireless device 505.

At 540, the network entity 105-*e* may obtain a second set of one or more parameters associated with the at least one first wireless device 505 according to a learning model for energy management and the first set of one or more parameters, wherein the first set of one or more parameters comprises an input to the learning model, and wherein the second set of one or more parameters comprises an output of the learning model.

At 545, the network entity 105-*e* may obtain a third set of one or more parameters associated with the at least one first wireless device 505 according to the learning model and based at least in part on a handover event at the at least one first wireless device 505. In some examples, the third set of one or more parameters may be an updated set of parameters associated with the at least one first wireless device 505 based at least in part on the handover event.

At 550, the network entity 105-*e* may schedule one or more resources for outputting a beamformed wave for energy charging the at least one first wireless device 505 based at least in part on the first set of one or more parameters and the second set of one or more parameters and according to the learning model for energy management. In some examples, the beamformed wave may be an FMCW waveform, an OFDM waveform, or another sensing waveform.

At 555, the network entity 105-*e* may perform an energy management operation for the at least one first wireless device 505 by one or more of: outputting the beamformed wave for energy charging the at least one first wireless device 505, or outputting an indication to transmit a beamformed wave for energy charging the at least one first wireless device 505 to the at least one second wireless device 510, based at least in part on the second set of one or more parameters and according to the learning model for energy management. In some examples, the network entity may perform the energy management operation in accordance with the capability of the at least one second wireless device 510. Additionally, or alternatively, the network entity 105-*e* may perform the energy management operation based at least in part on receiving the signaling from the at least one first wireless device 505, based at least in part on receiving the signaling from the at least one second wireless device 510, or both At 555, the second wireless device 510 may receive, from the network entity 105-*e*, an indication for the second wireless device 510 to transmit a beamformed wave for energy charging the at least one first wireless device 505. In some cases, the second wireless device may receive the indication from another second wireless device 510 in communications with both the network entity 105-*e* and the second wireless device 510.

At 560, the second wireless device 510 may communicate with the network entity, the at least one first wireless device, or both in accordance with a capability of the second wireless device and based at least in part on receiving the indication from the network entity. In some examples, at 565, the second wireless device 510 may determine one or more parameters associated with a beamformed wave for energy charging the at least one first wireless device 505. At 570, the second wireless device may transmit the beamformed wave to the at least one first wireless device 505. The second wireless device may transmit the beamformed wave in accordance with the one or more parameters.

At 575, the first wireless device 505 may perform the energy management operation using a beamformed wave for energy charging the first wireless device 505 transmitted by one or more of the network entity 105-*e* or the at least one second wireless device 510. In some examples, the first wireless device 505 may charge a battery of the first wireless device 505 using the beamformed wave in accordance with the energy management operation.

At 580, the first wireless device 505 may perform one or more measurements on the beamformed wave for energy charging the first wireless device 505. In some examples, the first wireless device 505 may perform the one or more measurements based at least in part on the signal strength of the beamformed wave satisfying a threshold, based at least in part on the battery level satisfying a threshold, or in accordance with a periodicity.

At 585, the first wireless device 505 may transmit a report to the network entity 105-*e* indicating a signal strength of the beamformed wave, a battery level of the first wireless device 505, or both. Additionally, or alternatively, at 585, the first wireless device 505 may transmit, to the network entity 105-*e*, a report indicating a status of the first wireless device 505 based at least in part on performing the energy management operation and receiving a request to report the status of the at least one second wireless device 510 from the network entity 105-*c*. In some examples, the first wireless device 505 may refrain from transmitting (e.g., may skip transmitting, may not perform transmitting, may avoid transmitting) a second report to the network entity 105-*e* based at least in part on the battery level satisfying a threshold. Additionally, or alternatively, the first wireless device 505 may receive an indication from the network entity to refrain from transmitting the second report.

Figure 6:
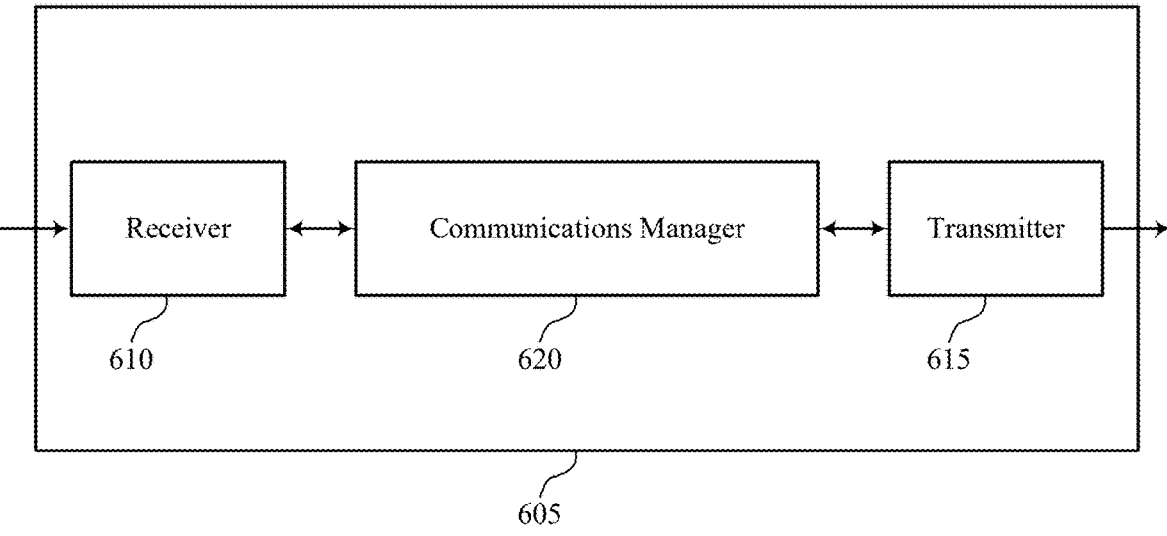
FIGS. 6 and 7 show block diagrams of devices that support sensing-based energy harvesting and management for ambient internet of things devices in accordance with one or more aspects of the present disclosure.

FIG. 6 shows a block diagram 600 of a device 605 that supports sensing-based energy harvesting and management for ambient internet of things devices in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations or components thereof may be examples of means for performing various aspects of sensing-based energy harvesting and management for ambient internet of things devices as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for obtaining a first set of one or more parameters associated with at least one first wireless device based on a sensing procedure. The communications manager 620 is capable of, configured to, or operable to support a means for obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model. The communications manager 620 is capable of, configured to, or operable to support a means for performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced power consumption.

Figure 7:
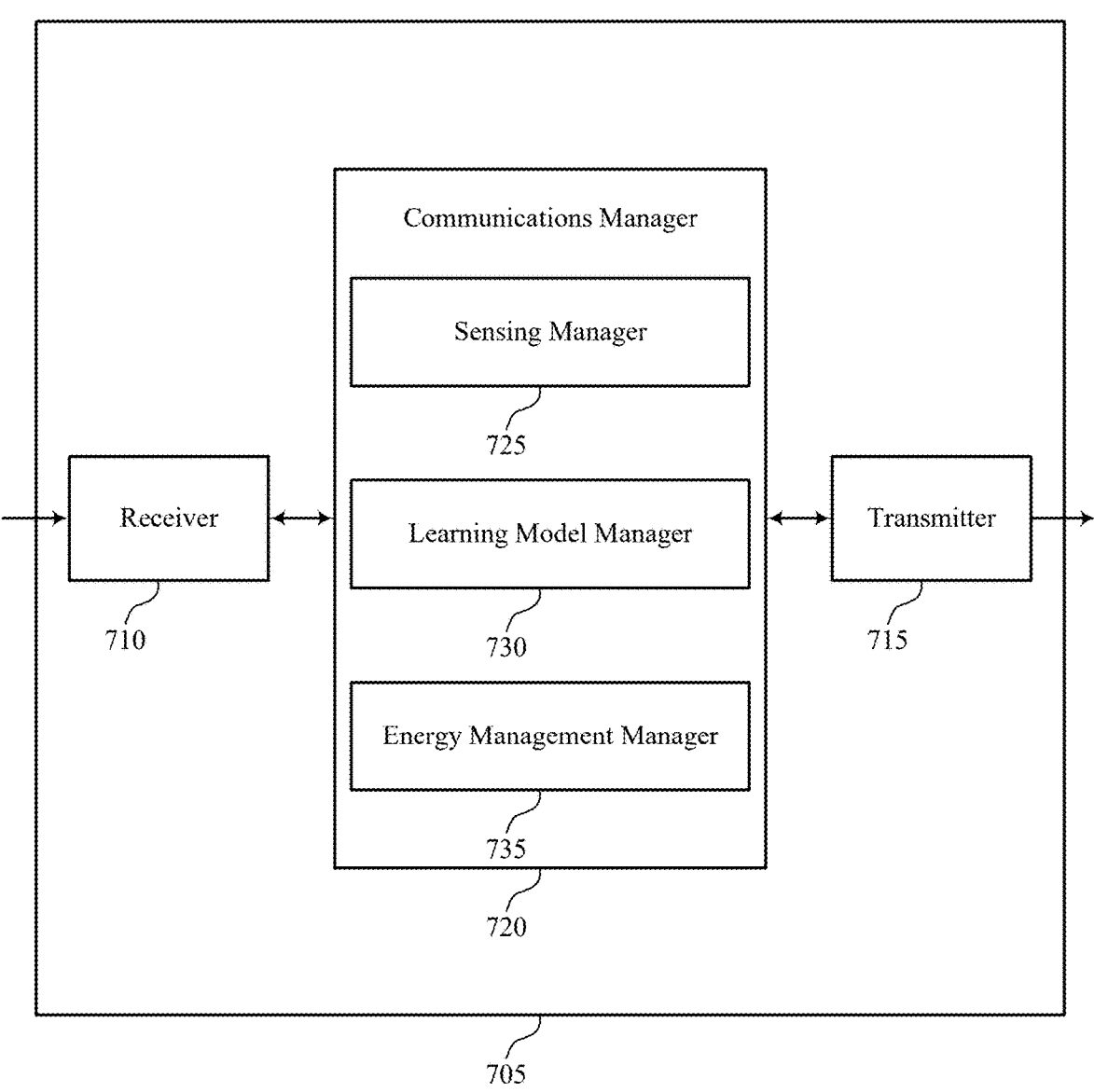

FIG. 7 shows a block diagram 700 of a device 705 that supports sensing-based energy harvesting and management for ambient internet of things devices in accordance with one or more aspects of the present disclosure. The device 705 may be an example of aspects of a device 605 or a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of sensing-based energy harvesting and management for ambient internet of things devices as described herein. For example, the communications manager 720 may include a sensing manager 725, a learning model manager 730, an energy management manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The sensing manager 725 is capable of, configured to, or operable to support a means for obtaining a first set of one or more parameters associated with at least one first wireless device based on a sensing procedure. The learning model manager 730 is capable of, configured to, or operable to support a means for obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model. The energy management manager 735 is capable of, configured to, or operable to support a means for performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

Figure 8:
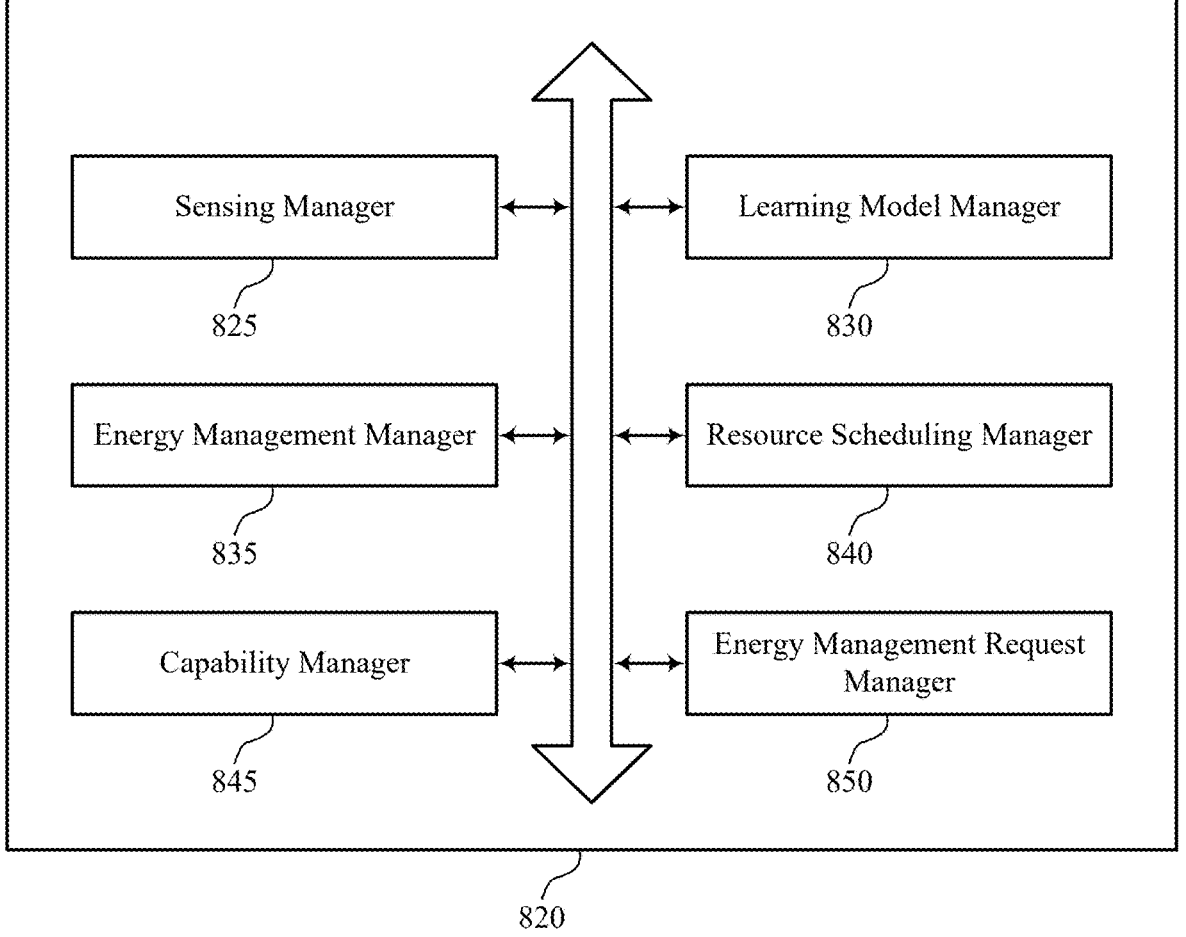
FIG. 8 shows a block diagram of a communications manager that supports sensing-based energy harvesting and management for ambient internet of things devices in accordance with one or more aspects of the present disclosure.

FIG. 8 shows a block diagram 800 of a communications manager 820 that supports sensing-based energy harvesting and management for ambient internet of things devices in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sensing-based energy harvesting and management for ambient internet of things devices as described herein. For example, the communications manager 820 may include a sensing manager 825, a learning model manager 830, an energy management manager 835, a resource scheduling manager 840, a capability manager 845, an energy management request manager 850, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The sensing manager 825 is capable of, configured to, or operable to support a means for obtaining a first set of one or more parameters associated with at least one first wireless device based on a sensing procedure. The learning model manager 830 is capable of, configured to, or operable to support a means for obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model. The energy management manager 835 is capable of, configured to, or operable to support a means for performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

In some examples, the resource scheduling manager 840 is capable of, configured to, or operable to support a means for scheduling one or more resources for outputting the beamformed wave based on the first set of one or more parameters and the second set of one or more parameters and according to the learning model for energy management.

In some examples, the capability manager 845 is capable of, configured to, or operable to support a means for determining a capability of the at least one second wireless device based on the sensing procedure. In some examples, the energy management manager 835 is capable of, configured to, or operable to support a means for performing the energy management operation in accordance with the capability of the at least one second wireless device.

In some examples, the energy management request manager 850 is capable of, configured to, or operable to support a means for receiving signaling from the at least one first wireless device indicating a request for an energy management operation for the at least one first wireless device, where the signaling includes an input to the learning model. In some examples, the energy management manager 835 is capable of, configured to, or operable to support a means for performing the energy management operation based on receiving the signaling from the at least one first wireless device.

In some examples, the energy management request manager 850 is capable of, configured to, or operable to support a means for receiving signaling from the at least one second wireless device indicating a request for an energy management operation for the at least one first wireless device, where the signaling includes an input to the learning model. In some examples, the energy management manager 835 is capable of, configured to, or operable to support a means for performing the energy management operation based on receiving the signaling from the at least one second wireless device.

In some examples, the learning model manager 830 is capable of, configured to, or operable to support a means for obtaining a third set of one or more parameters associated with the at least one first wireless device according to the learning model and based on a handover event at the at least one first wireless device.

In some examples, the beamformed wave is a frequency modulated continuous wave (FMCW) waveform, an orthogonal frequency-division multiplexing (OFDM) waveform, or another sensing waveform.

Figure 9:
FIG. 9 shows a diagram of a system including a device that supports sensing-based energy harvesting and management for ambient internet of things devices in accordance with one or more aspects of the present disclosure.

FIG. 9 shows a diagram of a system 900 including a device 905 that supports sensing-based energy harvesting and management for ambient internet of things devices in accordance with one or more aspects of the present disclosure. The device 905 may be an example of or include components of a device 605, a device 705, or a network entity 105 as described herein. The device 905 may communicate with other network devices or network equipment such as one or more of the network entities 105, UEs 115, or any combination thereof. The communications may include communications over one or more wired interfaces, over one or more wireless interfaces, or any combination thereof. The device 905 may include components that support outputting and obtaining communications, such as a communications manager 920, a transceiver 910, one or more antennas 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., communication link(s) 125, backhaul communication link(s) 120, a midhaul communication link 162, a fronthaul communication link 168).

The at least one memory 925 may include RAM, ROM, or any combination thereof. The at least one memory 925 may store computer-readable, computer-executable, or processor-executable code, such as the code 930. The code 930 may include instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may include, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting sensing-based energy harvesting and management for ambient internet of things devices). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925).

In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with one or more other network entities 105, and may include a controller or scheduler for controlling communications with UEs 115 (e.g., in cooperation with the one or more other network devices). In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for obtaining a first set of one or more parameters associated with at least one first wireless device based on a sensing procedure. The communications manager 920 is capable of, configured to, or operable to support a means for obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model. The communications manager 920 is capable of, configured to, or operable to support a means for performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management.

By including or configuring the communications manager 920 in accordance with examples as described herein, the device 905 may support techniques for improved user experience related to reduced power consumption and longer battery life.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of sensing-based energy harvesting and management for ambient internet of things devices as described herein, or the at least one processor 935 and the at least one memory 925 may be otherwise configured to, individually or collectively, perform or support such operations.

Figure 10:
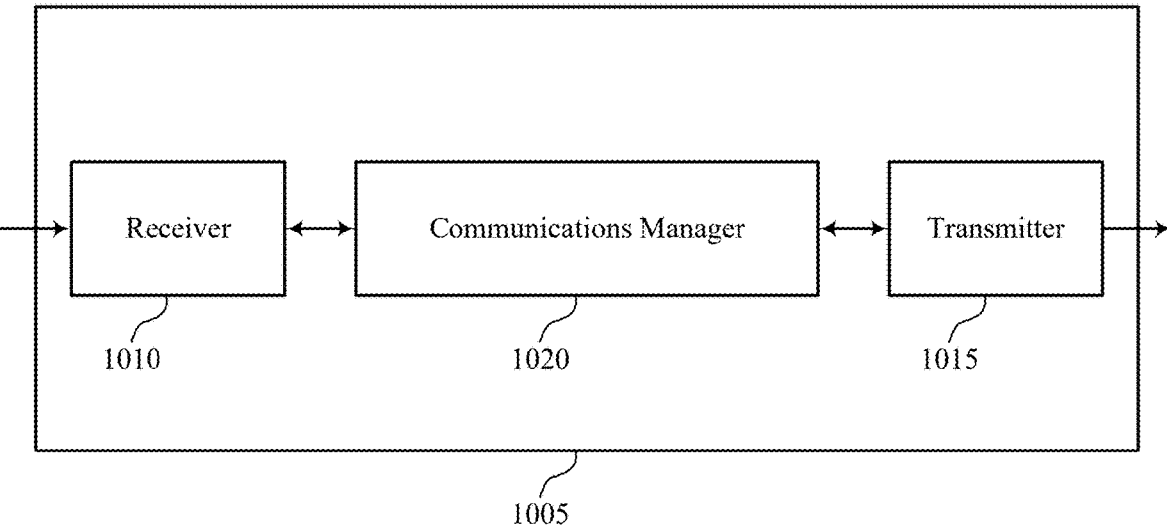
FIGS. 10 and 11 show block diagrams of devices that support sensing-based energy harvesting and management for ambient internet of things devices in accordance with one or more aspects of the present disclosure.

FIG. 10 shows a block diagram 1000 of a device 1005 that supports sensing-based energy harvesting and management for ambient internet of things devices in accordance with one or more aspects of the present disclosure. The device 1005 may be an example of aspects of a first wireless device as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to sensing-based energy harvesting and management for ambient internet of things devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to sensing-based energy harvesting and management for ambient internet of things devices). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations or components thereof may be examples of means for performing various aspects of sensing-based energy harvesting and management for ambient internet of things devices as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for performing a sensing procedure. The communications manager 1020 is capable of, configured to, or operable to support a means for transmitting signaling to one or more of a network entity or at least one second wireless device based on the sensing procedure, the signaling indicating a request for an energy management operation. The communications manager 1020 is capable of, configured to, or operable to support a means for performing the energy management operation using a beamformed wave for energy charging the first wireless device transmitted by one or more of the network entity or the at least one second wireless device.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced power consumption.

Figure 11:
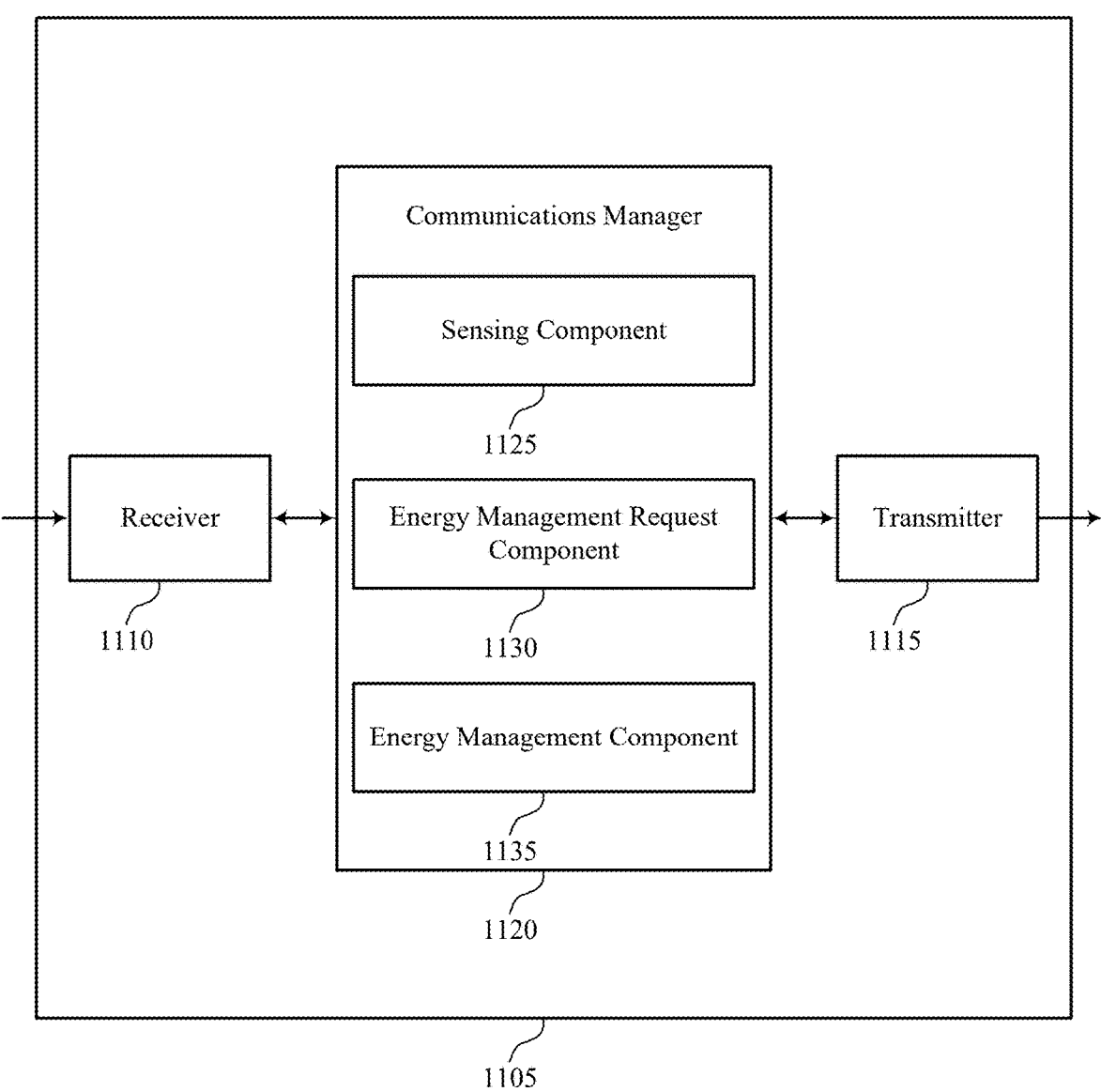

FIG. 11 shows a block diagram 1100 of a device 1105 that supports sensing-based energy harvesting and management for ambient internet of things devices in accordance with one or more aspects of the present disclosure. The device 1105 may be an example of aspects of a device 1005, a UE 115, an AIoT device, or a first wireless device 505 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to sensing-based energy harvesting and management for ambient internet of things devices). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sensing-based energy harvesting and management for ambient internet of things devices). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of sensing-based energy harvesting and management for ambient internet of things devices as described herein. For example, the communications manager 1120 may include a sensing component 1125, an energy management request component 1130, an energy management component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The sensing component 1125 is capable of, configured to, or operable to support a means for performing a sensing procedure. The energy management request component 1130 is capable of, configured to, or operable to support a means for transmitting signaling to one or more of a network entity or at least one second wireless device based on the sensing procedure, the signaling indicating a request for an energy management operation. The energy management component 1135 is capable of, configured to, or operable to support a means for performing the energy management operation using a beamformed wave for energy charging the first wireless device transmitted by one or more of the network entity or the at least one second wireless device.

Figure 12:
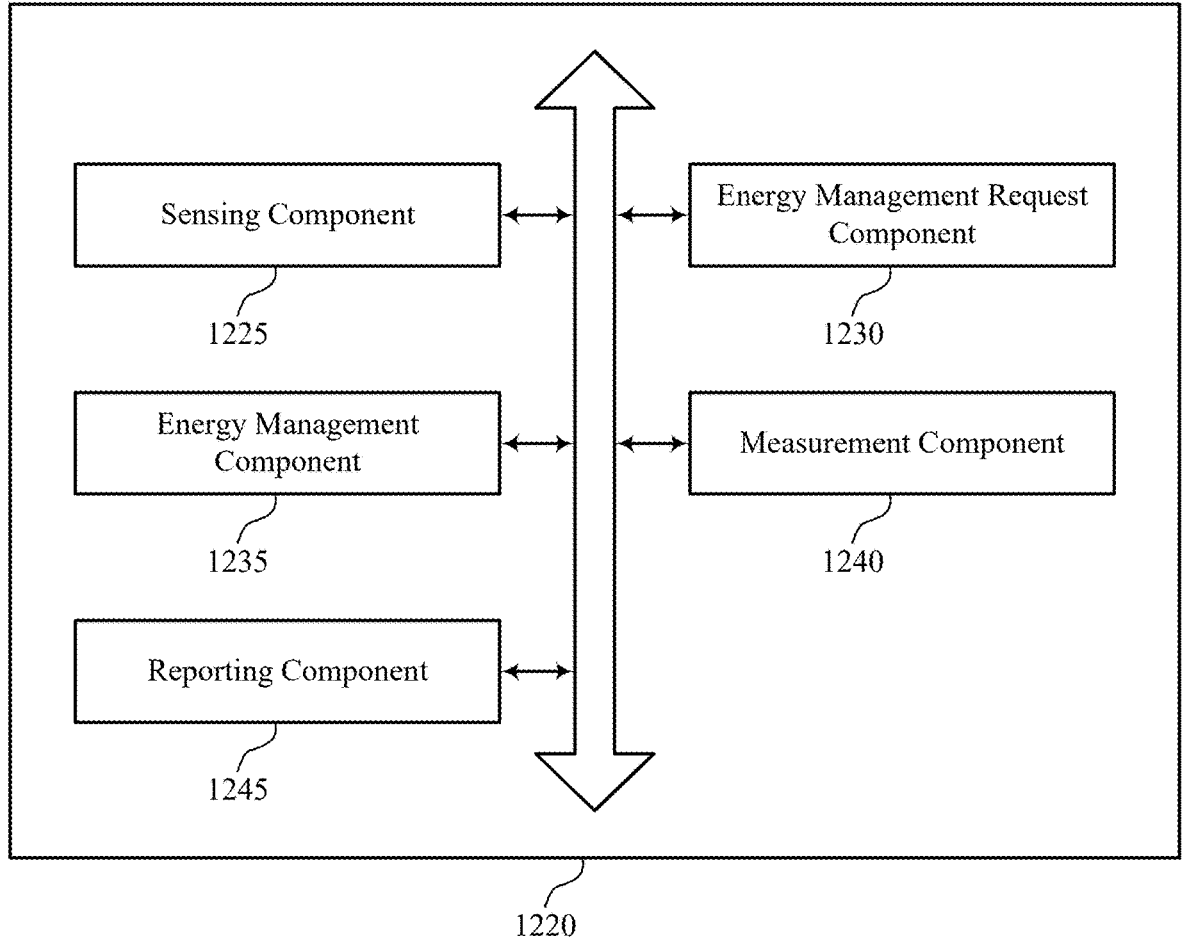
FIG. 12 shows a block diagram of a communications manager that supports sensing-based energy harvesting and management for ambient internet of things devices in accordance with one or more aspects of the present disclosure.

FIG. 12 shows a block diagram 1200 of a communications manager 1220 that supports sensing-based energy harvesting and management for ambient internet of things devices in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of sensing-based energy harvesting and management for ambient internet of things devices as described herein. For example, the communications manager 1220 may include a sensing component 1225, an energy management request component 1230, an energy management component 1235, a measurement component 1240, a reporting component 1245, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The sensing component 1225 is capable of, configured to, or operable to support a means for performing a sensing procedure. The energy management request component 1230 is capable of, configured to, or operable to support a means for transmitting signaling to one or more of a network entity or at least one second wireless device based on the sensing procedure, the signaling indicating a request for an energy management operation. The energy management component 1235 is capable of, configured to, or operable to support a means for performing the energy management operation using a beamformed wave for energy charging the first wireless device transmitted by one or more of the network entity or the at least one second wireless device.

In some examples, the measurement component 1240 is capable of, configured to, or operable to support a means for performing one or more measurements on the beamformed wave for energy charging the first wireless device. In some examples, the reporting component 1245 is capable of, configured to, or operable to support a means for transmitting a report to the network entity indicating a signal strength of the beamformed wave, a battery level of the first wireless device, or both.

In some examples, the first wireless device performs the one or more measurements based on the signal strength of the beamformed wave satisfying a threshold, based on the battery level satisfying a threshold, or in accordance with a periodicity.

In some examples, the reporting component 1245 is capable of, configured to, or operable to support a means for refraining from transmitting a second report to the network entity based on the battery level satisfying a threshold.

In some examples, the reporting component 1245 is capable of, configured to, or operable to support a means for receiving an indication from the network entity to refrain from transmitting a second report.

In some examples, the reporting component 1245 is capable of, configured to, or operable to support a means for transmitting, to the network entity, a report indicating a status of the first wireless device based on performing the energy management operation and receiving a request to report the status of the at least one second wireless device from the network entity.

In some examples, the beamformed wave is a frequency modulated continuous wave (FMCW) waveform, an orthogonal frequency-division multiplexing (OFDM) waveform, or another sensing waveform.

In some examples, the signaling includes a last report message or a power request message.

Figure 13:
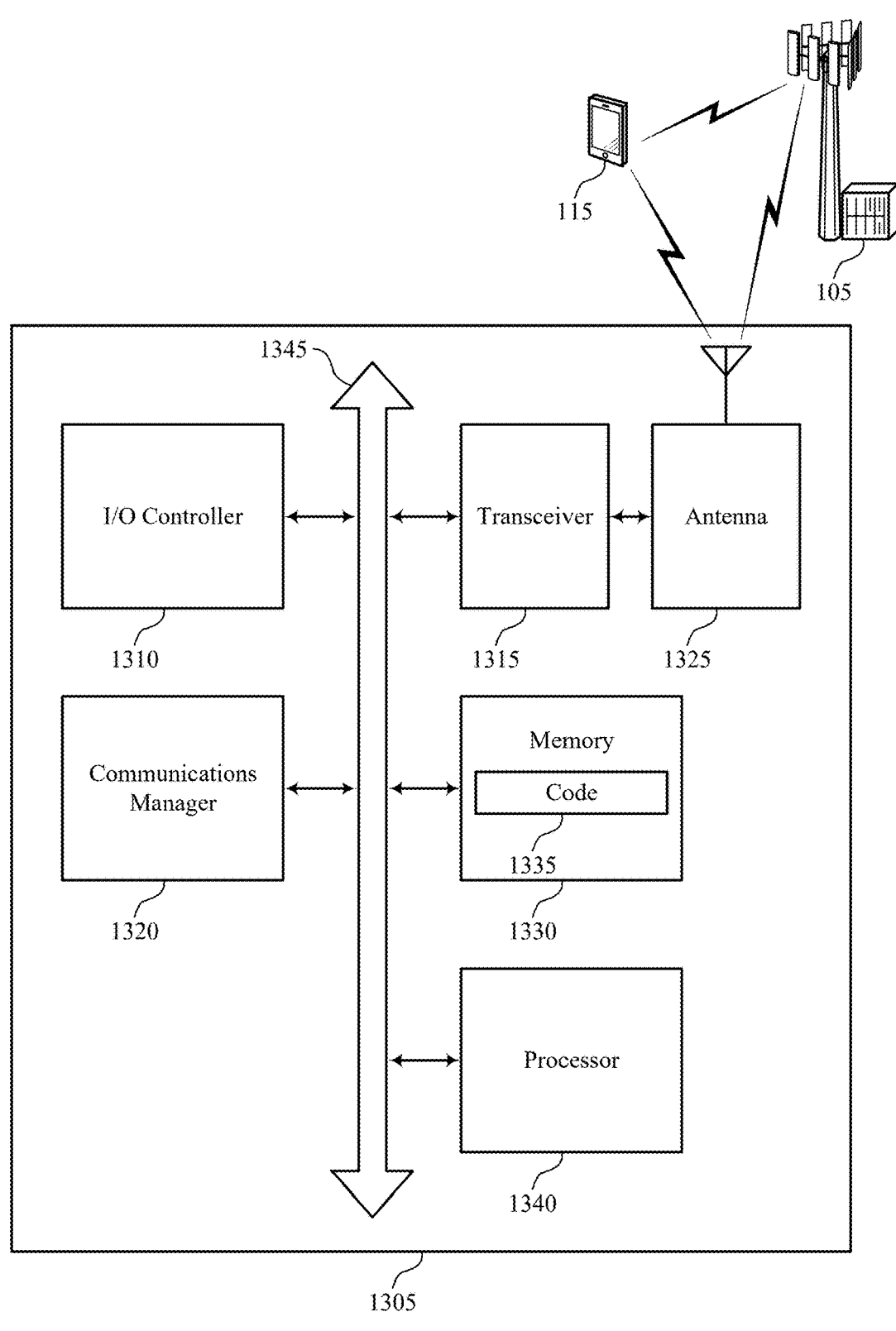
FIG. 13 shows a diagram of a system including a device that supports sensing-based energy harvesting and management for ambient internet of things devices in accordance with one or more aspects of the present disclosure.

FIG. 13 shows a diagram of a system 1300 including a device 1305 that supports sensing-based energy harvesting and management for ambient internet of things devices in accordance with one or more aspects of the present disclosure. The device 1305 may be an example of or include components of a device 1005, a device 1105, or a first wireless device as described herein. The device 1305 may include components for bi-directional voice and data communications including components for transmitting and receiving communications, such as a communications manager 1320, an I/O controller, such as an I/O controller 1310, a transceiver 1315, one or more antennas 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna. However, in some other cases, the device 1305 may have more than one antenna, which may be capable of concurrently transmitting or receiving multiple wireless transmissions. The transceiver 1315 may communicate bi-directionally via the one or more antennas 1325 using wired or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include RAM and ROM. The at least one memory 1330 may store computer-readable, computer-executable, or processor-executable code, such as the code 1335. The code 1335 may include instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may include, among other things, a BIOS which may control basic hardware or software operation such as the interaction with peripheral components or devices.

The at least one processor 1340 may include one or more intelligent hardware devices (e.g., one or more general-purpose processors, one or more DSPs, one or more CPUs, one or more GPUs, one or more NPUs (also referred to as neural network processors or DLPs), one or more micro-controllers, one or more ASICs, one or more FPGAs, one or more programmable logic devices, discrete gate or transistor logic, one or more discrete hardware components, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting sensing-based energy harvesting and management for ambient internet of things devices). For example, the device 1305 or a component of the device 1305 may include at least one processor 1340 and at least one memory 1330 coupled with or to the at least one processor 1340, the at least one processor 1340 and the at least one memory 1330 configured to perform various functions described herein.

In some examples, the at least one processor 1340 may include multiple processors and the at least one memory 1330 may include multiple memories. One or more of the multiple processors may be coupled with one or more of the multiple memories, which may, individually or collectively, be configured to perform various functions described herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code 1335 (e.g., processor-executable code) stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for performing a sensing procedure. The communications manager 1320 is capable of, configured to, or operable to support a means for transmitting signaling to one or more of a network entity or at least one second wireless device based on the sensing procedure, the signaling indicating a request for an energy management operation. The communications manager 1320 is capable of, configured to, or operable to support a means for performing the energy management operation using a beamformed wave for energy charging the first wireless device transmitted by one or more of the network entity or the at least one second wireless device.

By including or configuring the communications manager 1320 in accordance with examples as described herein, the device 1305 may support techniques for improved user experience related to reduced power consumption and longer battery life.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of sensing-based energy harvesting and management for ambient internet of things devices as described herein, or the at least one processor 1340 and the at least one memory 1330 may be otherwise configured to, individually or collectively, perform or support such operations.

Figure 14:
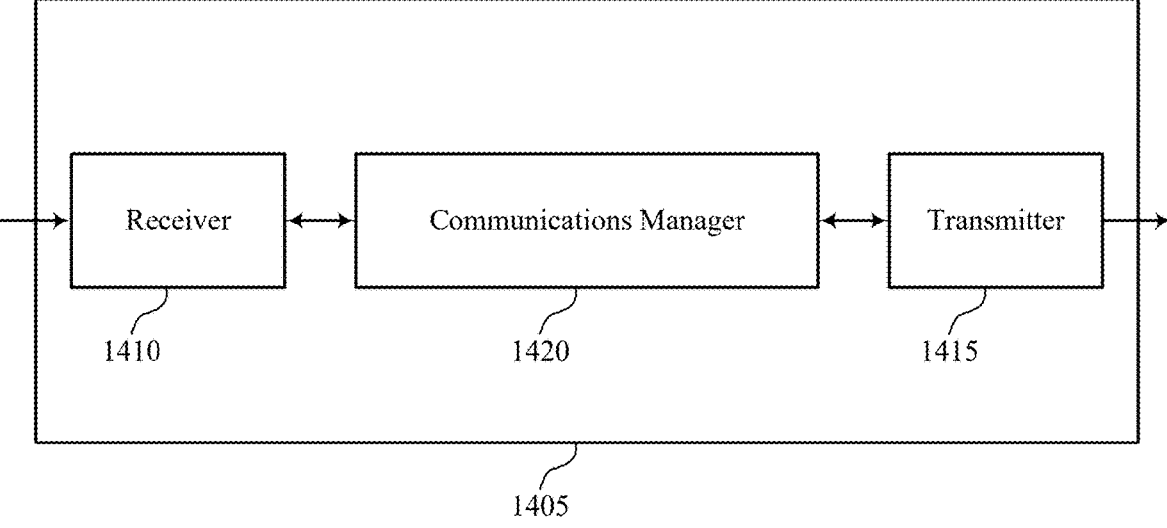
FIGS. 14 and 15 show block diagrams of devices that support sensing-based energy harvesting and management for ambient internet of things devices in accordance with one or more aspects of the present disclosure.

FIG. 14 shows a block diagram 1400 of a device 1405 that supports sensing-based energy harvesting and management for ambient internet of things devices in accordance with one or more aspects of the present disclosure. The device 1405 may be an example of aspects of a second wireless device as described herein. The device 1405 may include a receiver 1410, a transmitter 1415, and a communications manager 1420. The device 1405, or one or more components of the device 1405 (e.g., the receiver 1410, the transmitter 1415, the communications manager 1420), may include at least one processor, which may be coupled with at least one memory, to, individually or collectively, support or enable the described techniques. Each of these components may be in communication with one another (e.g., via one or more buses).

The receiver 1410 may provide a means for receiving information such as packets, user data, control information, or any combination thereof associated with various information channels (e.g., control channels, data channels, information channels related to sensing-based energy harvesting and management for ambient internet of things devices). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to sensing-based energy harvesting and management for ambient internet of things devices). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations or components thereof may be examples of means for performing various aspects of sensing-based energy harvesting and management for ambient internet of things devices as described herein. For example, the communications manager 1420, the receiver 1410, the transmitter 1415, or various combinations or components thereof may be capable of performing one or more of the functions described herein.

In some examples, the communications manager 1420, the receiver 1410, the transmitter 1415, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1420, the receiver 1410, the transmitter 1415, or various combinations or components thereof may be implemented in code (e.g., as communications management software) executed by at least one processor (e.g., referred to as a processor-executable code). If implemented in code executed by at least one processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. For example, the communications manager 1420 is capable of, configured to, or operable to support a means for receiving, from a network entity, an indication for the second wireless device to transmit a beamformed wave for energy charging at least one first wireless device. The communications manager 1420 is capable of, configured to, or operable to support a means for communicating with the network entity, the at least one first wireless device, or both in accordance with a capability of the second wireless device and based on receiving the indication from the network entity.

By including or configuring the communications manager 1420 in accordance with examples as described herein, the device 1405 (e.g., at least one processor controlling or otherwise coupled with the receiver 1410, the transmitter 1415, the communications manager 1420, or a combination thereof) may support techniques for reduced power consumption.

Figure 15:
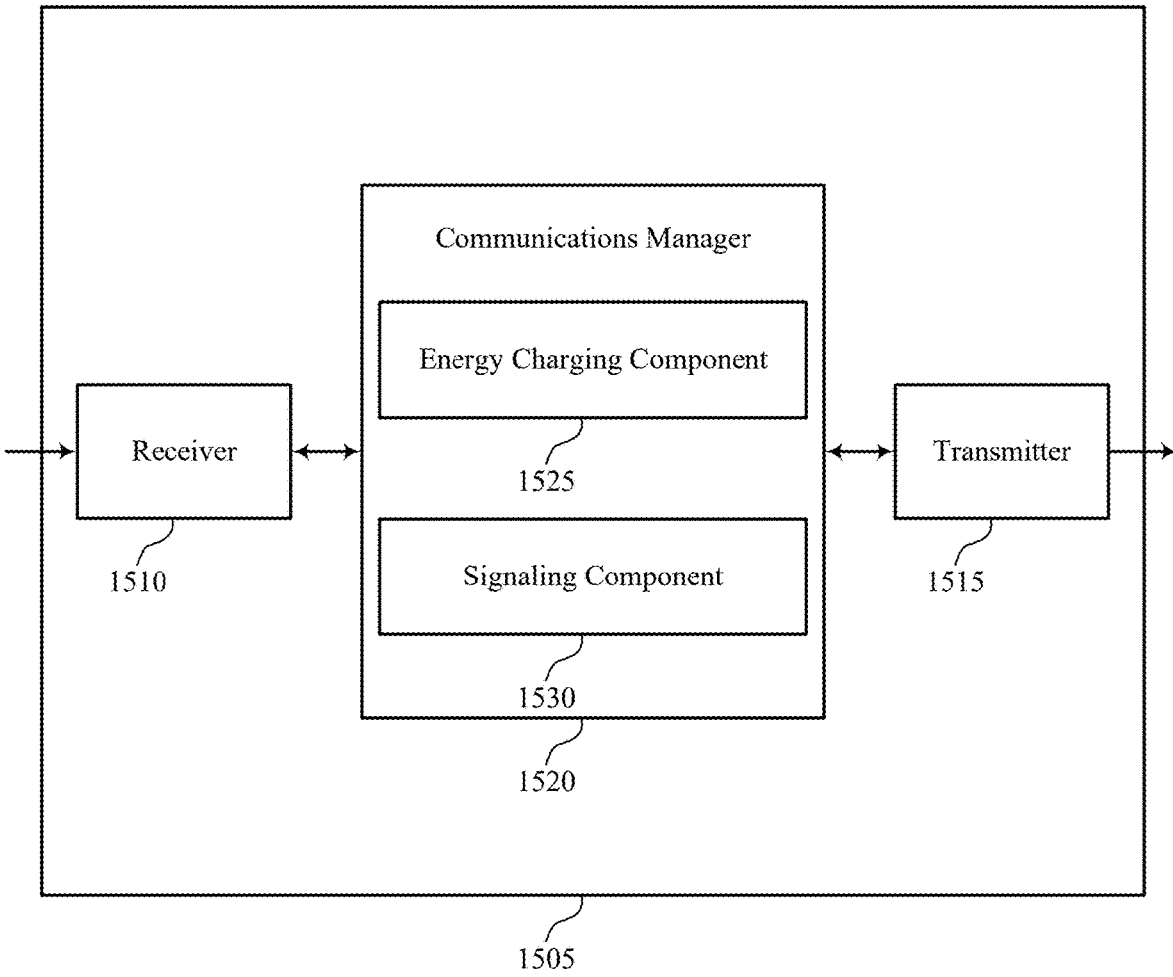

FIG. 15 shows a block diagram 1500 of a device 1505 that supports sensing-based energy harvesting and management for ambient internet of things devices in accordance with one or more aspects of the present disclosure. The device 1505 may be an example of aspects of a device 1405, a UE 115, an AIoT device, or a second wireless device 510 as described herein. The device 1505 may include a receiver 1510, a transmitter 1515, and a communications manager 1520. The device 1505, or one or more components of the device 1505 (e.g., the receiver 1510, the transmitter 1515, the communications manager 1520), may include at least one processor, which may be coupled with at least one memory, to support the described techniques. Each of these components may be in communication with one another (e.g., via one or more buses).

The receiver 1510 may provide a means for receiving information such as packets, user data, control information, or any combination thereof associated with various information channels (e.g., control channels, data channels, information channels related to sensing-based energy harvesting and management for ambient internet of things devices).

Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to sensing-based energy harvesting and management for ambient internet of things devices). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of sensing-based energy harvesting and management for ambient internet of things devices as described herein. For example, the communications manager 1520 may include an energy charging component 1525 a signaling component 1530, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications in accordance with examples as disclosed herein. The energy charging component 1525 is capable of, configured to, or operable to support a means for receiving, from a network entity, an indication for the second wireless device to transmit a beamformed wave for energy charging at least one first wireless device. The signaling component 1530 is capable of, configured to, or operable to support a means for communicating with the network entity, the at least one first wireless device, or both in accordance with a capability of the second wireless device and based on receiving the indication from the network entity.

Figure 16:
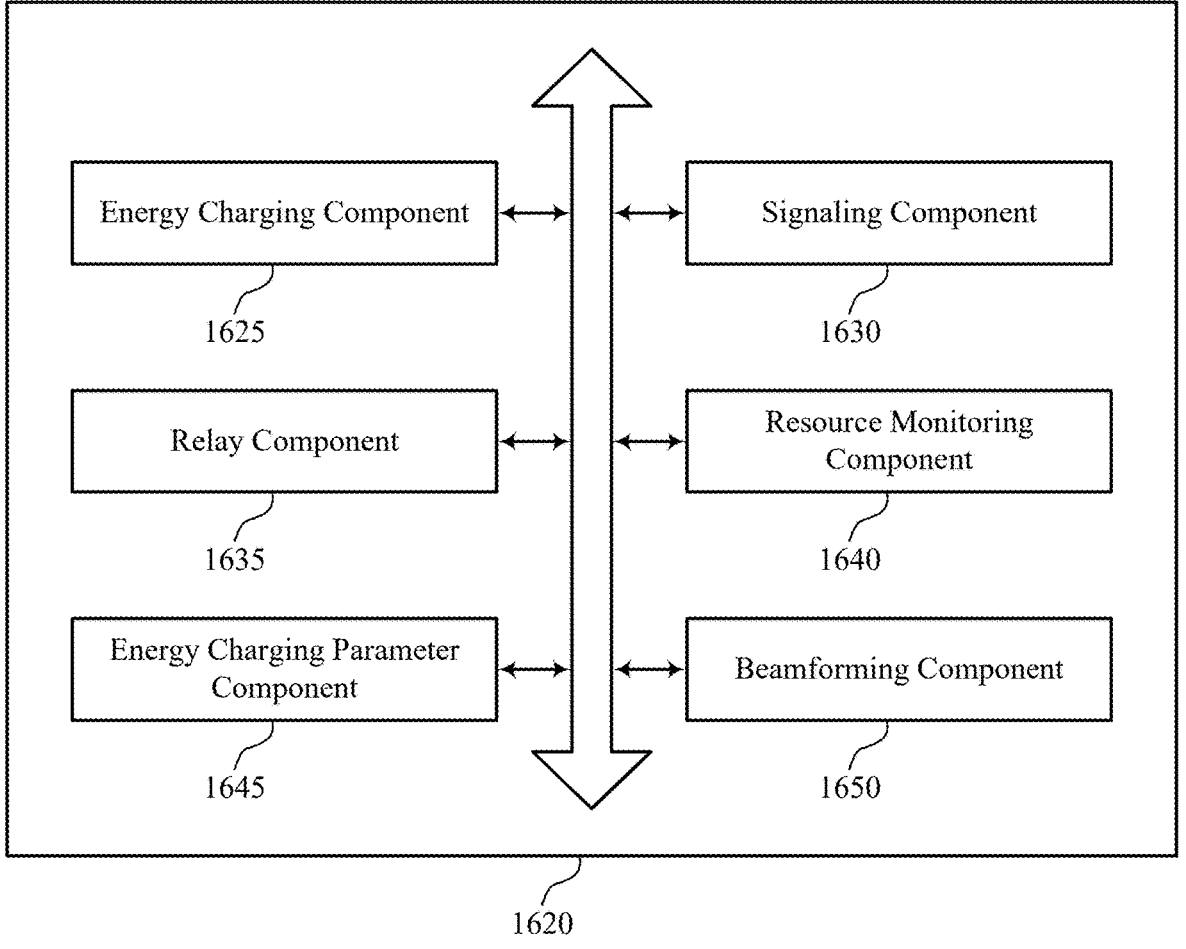
FIG. 16 shows a block diagram of a communications manager that supports sensing-based energy harvesting and management for ambient internet of things devices in accordance with one or more aspects of the present disclosure.

FIG. 16 shows a block diagram 1600 of a communications manager 1620 that supports sensing-based energy harvesting and management for ambient internet of things devices in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of sensing-based energy harvesting and management for ambient internet of things devices as described herein. For example, the communications manager 1620 may include an energy charging component 1625, a signaling component 1630, a relay component 1635, a resource monitoring component 1640, an energy charging parameter component 1645, a beamforming component 1650, or any combination thereof. Each of these components, or components or subcomponents thereof (e.g., one or more processors, one or more memories), may communicate, directly or indirectly, with one another (e.g., via one or more buses).

The communications manager 1620 may support wireless communications in accordance with examples as disclosed herein. The energy charging component 1625 is capable of, configured to, or operable to support a means for receiving, from a network entity, an indication for the second wireless device to transmit a beamformed wave for energy charging at least one first wireless device. The signaling component 1630 is capable of, configured to, or operable to support a means for communicating with the network entity, the at least one first wireless device, or both in accordance with a capability of the second wireless device and based on receiving the indication from the network entity.

In some examples, the signaling component 1630 is capable of, configured to, or operable to support a means for receiving signaling from the at least one first wireless device. In some examples, the relay component 1635 is capable of, configured to, or operable to support a means for relaying the signaling from the at least one first wireless device to the network entity in accordance with the capability of the second wireless device.

In some examples, the resource monitoring component 1640 is capable of, configured to, or operable to support a means for monitoring resources for signaling from the at least one first wireless device to the network entity in accordance with a request from the network entity to monitor the at least one first wireless device. In some examples, the relay component 1635 is capable of, configured to, or operable to support a means for relaying the signaling to the network entity based on determining that the network entity failed to receive the signaling from the at least one first wireless device.

In some examples, to support communicating with the network entity, the at least one first wireless device, or both, the energy charging parameter component 1645 is capable of, configured to, or operable to support a means for determining one or more parameters associated with the beamformed wave for energy charging the at least one first wireless device. In some examples, to support communicating with the network entity, the at least one first wireless device, or both, the beamforming component 1650 is capable of, configured to, or operable to support a means for transmitting the beamformed wave to the at least one first wireless device.

In some examples, the beamformed wave is a frequency modulated continuous wave (FMCW) waveform, an orthogonal frequency-division multiplexing (OFDM) waveform, or another sensing waveform.

Figure 17:
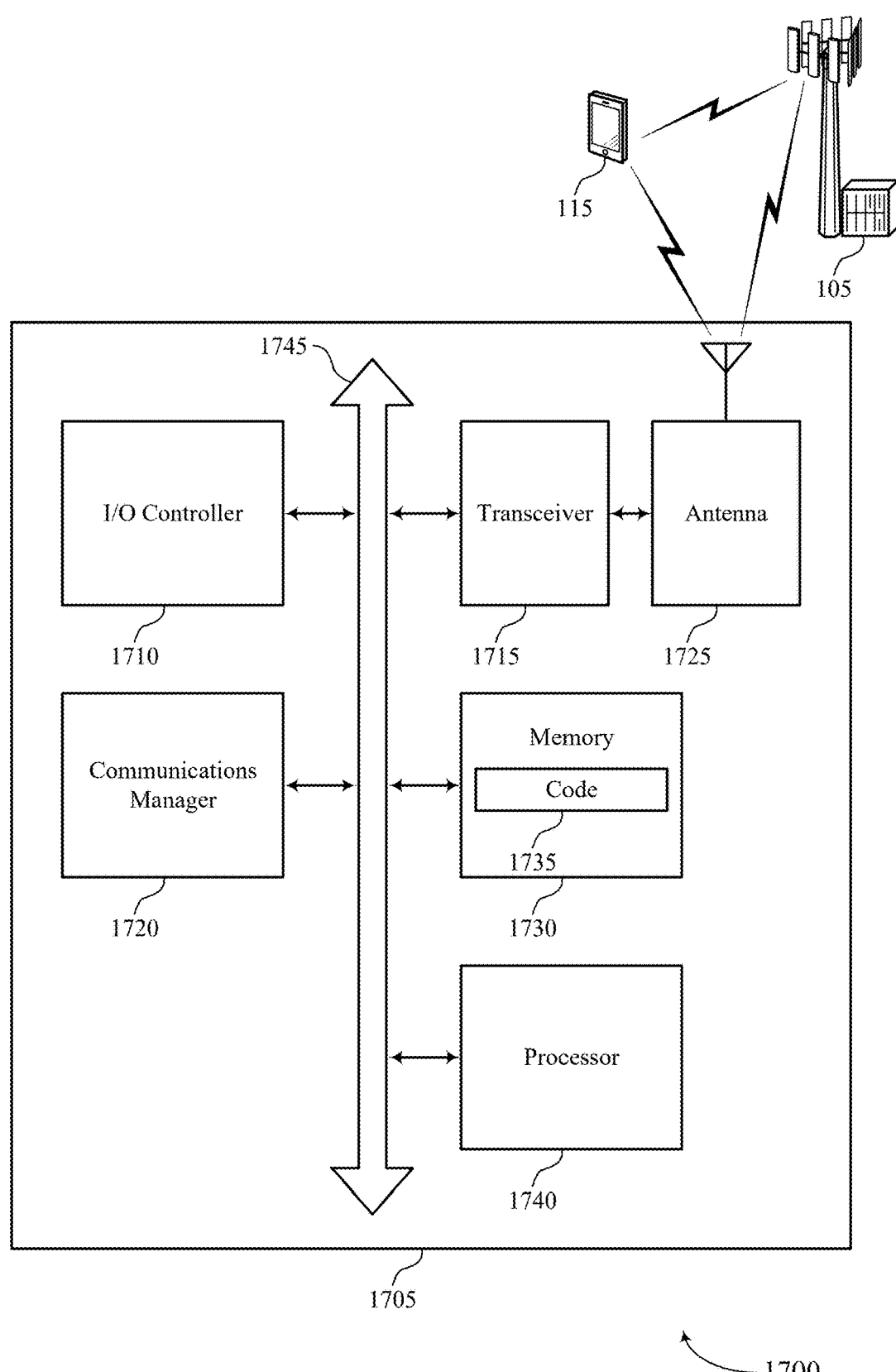
FIG. 17 shows a diagram of a system including a device that supports sensing-based energy harvesting and management for ambient internet of things devices in accordance with one or more aspects of the present disclosure.

FIG. 17 shows a diagram of a system 1700 including a device 1705 that supports sensing-based energy harvesting and management for ambient internet of things devices in accordance with one or more aspects of the present disclosure. The device 1705 may be an example of or include components of a device 1405, a device 1505, or a second wireless device as described herein. The device 1705 may include components for bi-directional voice and data communications including components for transmitting and receiving communications, such as a communications manager 1720, an I/O controller, such as an I/O controller 1710, a transceiver 1715, one or more antennas 1725, at least one memory 1730, code 1735, and at least one processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705.

In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of one or more processors, such as the at least one processor 1740. In some cases, a user may interact with the device 1705 via the I/O controller 1710 or via hardware components controlled by the I/O controller 1710.

In some cases, the device 1705 may include a single antenna. However, in some other cases, the device 1705 may have more than one antenna, which may be capable of concurrently transmitting or receiving multiple wireless transmissions. The transceiver 1715 may communicate bidirectionally via the one or more antennas 1725 using wired or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The at least one memory 1730 may include RAM and ROM. The at least one memory 1730 may store computer-readable, computer-executable, or processor-executable code, such as the code 1735. The code 1735 may include instructions that, when executed by the at least one processor 1740, cause the device 1705 to perform various functions described herein. The code 1735 may be stored in a non-transitory computer-readable medium such as system memory or another type of memory. In some cases, the code 1735 may not be directly executable by the at least one processor 1740 but may cause a computer (e.g., when compiled and executed) to perform functions described herein. In some cases, the at least one memory 1730 may include, among other things, a BIOS which may control basic hardware or software operation such as the interaction with peripheral components or devices.

The at least one processor 1740 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1740 may be configured to operate a memory array using a memory controller. In some other cases, a memory controller may be integrated into the at least one processor 1740. The at least one processor 1740 may be configured to execute computer-readable instructions stored in a memory (e.g., the at least one memory 1730) to cause the device 1705 to perform various functions (e.g., functions or tasks supporting sensing-based energy harvesting and management for ambient internet of things devices). For example, the device 1705 or a component of the device 1705 may include at least one processor 1740 and at least one memory 1730 coupled with or to the at least one processor 1740, the at least one processor 1740 and the at least one memory 1730 configured to perform various functions described herein.

In some examples, the at least one processor 1740 may include multiple processors and the at least one memory 1730 may include multiple memories. One or more of the multiple processors may be coupled with one or more of the multiple memories, which may, individually or collectively, be configured to perform various functions described herein. In some examples, the at least one processor 1740 may be a component of a processing system, which may refer to a system (such as a series) of machines, circuitry (including, for example, one or both of processor circuitry (which may include the at least one processor 1740) and memory circuitry (which may include the at least one memory 1730)), or components, that receives or obtains inputs and processes the inputs to produce, generate, or obtain a set of outputs. The processing system may be configured to perform one or more of the functions described herein. For example, the at least one processor 1740 or a processing system including the at least one processor 1740 may be configured to, configurable to, or operable to cause the device 1705 to perform one or more of the functions described herein. Further, as described herein, being "configured to," being "configurable to," and being "operable to" may be used interchangeably and may be associated with a capability, when executing code 1735 (e.g., processor-executable code) stored in the at least one memory 1730 or otherwise, to perform one or more of the functions described herein.

The communications manager 1720 may support wireless communications in accordance with examples as disclosed herein. For example, the communications manager 1720 is capable of, configured to, or operable to support a means for receiving, from a network entity, an indication for the second wireless device to transmit a beamformed wave for energy charging at least one first wireless device. The communications manager 1720 is capable of, configured to, or operable to support a means for communicating with the network entity, the at least one first wireless device, or both in accordance with a capability of the second wireless device and based on receiving the indication from the network entity.

By including or configuring the communications manager 1720 in accordance with examples as described herein, the device 1705 may support techniques for improved user experience related to reduced power consumption and longer battery life.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the at least one processor 1740, the at least one memory 1730, the code 1735, or any combination thereof. For example, the code 1735 may include instructions executable by the at least one processor 1740 to cause the device 1705 to perform various aspects of sensing-based energy harvesting and management for ambient internet of things devices as described herein, or the at least one processor 1740 and the at least one memory 1730 may be otherwise configured to, individually or collectively, perform or support such operations.

FIG. 18 shows a flowchart illustrating a method 1800 that supports sensing-based energy harvesting and management for ambient internet of things devices in accordance with one or more aspects of the present disclosure. The operations of the method 1800 may be implemented by a network entity or its components as described herein. For example, the operations of the method 1800 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1805, the method may include obtaining a first set of one or more parameters associated with at least one first wireless device based on a sensing procedure. The operations of 1805 may be performed in accordance with examples as disclosed herein. In some examples, aspects of the operations of 1805 may be performed by a sensing manager 825 as described with reference to FIG. 8.

At 1810, the method may include obtaining a second set of one or more parameters associated with the at least one first wireless device according to a learning model for energy management and the first set of one or more parameters, where the first set of one or more parameters includes an input to the learning model, and where the second set of one or more parameters includes an output of the learning model. The operations of 1810 may be performed in accordance with examples as disclosed herein. In some examples, aspects of the operations of 1810 may be performed by a learning model manager 830 as described with reference to FIG. 8.

At 1815, the method may include performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based on the second set of one or more parameters and according to the learning model for energy management. The operations of 1815 may be performed in accordance with examples as disclosed herein. In some examples, aspects of the operations of 1815 may be performed by an energy management manager 835 as described with reference to FIG. 8.

FIG. 19 shows a flowchart illustrating a method 1900 that supports sensing-based energy harvesting and management for ambient internet of things devices in accordance with one or more aspects of the present disclosure. The operations of the method 1900 may be implemented by a first wireless device or its components as described herein. For example, the operations of the method 1900 may be performed by a first wireless device as described with reference to FIGS. 1 through 5 and 10 through 13. In some examples, a first wireless device may execute a set of instructions to control the functional elements of the first wireless device to perform the described functions. Additionally, or alternatively, the first wireless device may perform aspects of the described functions using special-purpose hardware.

At 1905, the method may include performing a sensing procedure. The operations of 1905 may be performed in accordance with examples as disclosed herein. In some examples, aspects of the operations of 1905 may be performed by a sensing component 1225 as described with reference to FIG. 12.

At 1910, the method may include transmitting signaling to one or more of a network entity or at least one second wireless device based on the sensing procedure, the signaling indicating a request for an energy management operation. The operations of 1910 may be performed in accordance with examples as disclosed herein. In some examples, aspects of the operations of 1910 may be performed by an energy management request component 1230 as described with reference to FIG. 12.

At 1915, the method may include performing the energy management operation using a beamformed wave for energy charging the first wireless device transmitted by one or more of the network entity or the at least one second wireless device. The operations of 1915 may be performed in accordance with examples as disclosed herein. In some examples, aspects of the operations of 1915 may be performed by an energy management component 1235 as described with reference to FIG. 12.

FIG. 20 shows a flowchart illustrating a method 2000 that supports sensing-based energy harvesting and management for ambient internet of things devices in accordance with one or more aspects of the present disclosure. The operations of the method 2000 may be implemented by a second wireless device or its components as described herein. For example, the operations of the method 2000 may be performed by a second wireless device as described with reference to FIGS. 1 through 5 and 14 through 17. In some examples, a second wireless device may execute a set of instructions to control the functional elements of the second wireless device to perform the described functions. Additionally, or alternatively, the second wireless device may perform aspects of the described functions using special-purpose hardware.

At 2005, the method may include receiving, from a network entity, an indication for the second wireless device to transmit a beamformed wave for energy charging at least one first wireless device. The operations of 2005 may be performed in accordance with examples as disclosed herein. In some examples, aspects of the operations of 2005 may be performed by an energy charging component 1625 as described with reference to FIG. 16.

At 2010, the method may include communicating with the network entity, the at least one first wireless device, or both in accordance with a capability of the second wireless device and based on receiving the indication from the network entity. The operations of 2010 may be performed in accordance with examples as disclosed herein. In some examples, aspects of the operations of 2010 may be performed by a signaling component 1630 as described with reference to FIG. 16.

The following provides an overview of aspects of the present disclosure:

Aspect 1: A method for wireless communications at a network entity, comprising: obtaining a first set of one or more parameters associated with at least one first wireless device based at least in part on a sensing procedure; obtaining a second set of one or more parameters associated with the at least one first wireless device according to a learning model for energy management and the first set of one or more parameters, wherein the first set of one or more parameters comprises an input to the learning model, and wherein the second set of one or more parameters comprises an output of the learning model; and performing an energy management operation for the at least one first wireless device, by one or more of outputting a beamformed wave for energy charging the at least one first wireless device, or outputting an indication to transmit a beamformed wave for energy charging the at least one first wireless device to at least one second wireless device, based at least in part on the second set of one or more parameters and according to the learning model for energy management.

Aspect 2: The method of aspect 1, further comprising: scheduling one or more resources for outputting the beamformed wave based at least in part on the first set of one or more parameters and the second set of one or more parameters and according to the learning model for energy management.

Aspect 3: The method of any of aspects 1 through 2, further comprising: determining a capability of the at least one second wireless device based at least in part on the sensing procedure wherein performing the energy management operation is in accordance with the capability of the at least one second wireless device.

Aspect 4: The method of any of aspects 1 through 3, further comprising: receiving signaling from the at least one first wireless device indicating a request for an energy management operation for the at least one first wireless device, wherein the signaling comprises an input to the learning model, and wherein performing the energy management operation is based at least in part on receiving the signaling from the at least one first wireless device.

Aspect 5: The method of aspects 1 through 3, further comprising: receiving signaling from the at least one second wireless device indicating a request for an energy management operation for the at least one first wireless device, wherein the signaling comprises an input to the learning model, and wherein performing the energy management operation is based at least in part on receiving the signaling from the at least one second wireless device.

Aspect 6: The method of any of aspects 1 through 5, further comprising: obtaining a third set of one or more parameters associated with the at least one first wireless device according to the learning model and based at least in part on a handover event at the at least one first wireless device.

Aspect 7: The method of any of aspects 1 through 6, wherein the beamformed wave is an FMCW waveform, an OFDM waveform, or another sensing waveform.

Aspect 8: A method for wireless communications at a first wireless device comprising: performing a sensing procedure; transmitting signaling to one or more of a network entity or at least one second wireless device based at least in part on the sensing procedure, the signaling indicating a request for an energy management operation; and performing the energy management operation using a beamformed wave for energy charging the first wireless device transmitted by one or more of the network entity or the at least one second wireless device.

Aspect 9: The method of aspect 8, further comprising: performing one or more measurements on the beamformed wave for energy charging the first wireless device; and transmitting a report to the network entity indicating a signal strength of the beamformed wave, a battery level of the first wireless device, or both.

Aspect 10: The method of aspect 9, wherein the first wireless device performs the one or more measurements based at least in part on the signal strength of the beamformed wave satisfying a threshold, based at least in part on the battery level satisfying a threshold, or in accordance with a periodicity.

Aspect 11: The method of any of aspects 9 through 10, further comprising: refraining from transmitting a second report to the network entity based at least in part on the battery level satisfying a threshold.

Aspect 12: The method of any of aspects 9 through 11, further comprising: receiving an indication from the network entity to refrain from transmitting a second report.

Aspect 13: The method of any of aspects 8 through 12, further comprising: transmitting, to the network entity, a report indicating a status of the first wireless device based at least in part on performing the energy management operation and receiving a request to report the status of the at least one second wireless device from the network entity.

Aspect 14: The method of any of aspects 8 through 13, wherein the beamformed wave is an FMCW waveform, an OFDM waveform, or another sensing waveform.

Aspect 15: The method of any of aspects 8 through 14, wherein the signaling comprises a last report message or a power request message.

Aspect 16: A method for wireless communications at a second wireless device, comprising: receiving, from a network entity, an indication for the second wireless device to transmit a beamformed wave for energy charging at least one first wireless device; and communicating with the network entity, the at least one first wireless device, or both in accordance with a capability of the second wireless device and based at least in part on receiving the indication from the network entity.

Aspect 17: The method of aspect 16, further comprising: receiving signaling from the at least one first wireless device; and relaying the signaling from the at least one first wireless device to the network entity in accordance with the capability of the second wireless device.

Aspect 18: The method of any of aspects 16 through 17, further comprising: monitoring resources for signaling from the at least one first wireless device to the network entity in accordance with a request from the network entity to monitor the at least one first wireless device; and relaying the signaling to the network entity based at least in part on determining that the network entity failed to receive the signaling from the at least one first wireless device.

Aspect 19: The method of any of aspects 16 through 18, wherein communicating with the network entity, the at least one first wireless device, or both further comprises: determining one or more parameters associated with the beamformed wave for energy charging the at least one first wireless device; and transmitting the beamformed wave to the at least one first wireless device.

Aspect 20: The method of any of aspects 16 through 19, wherein the beamformed wave is an FMCW waveform, an OFDM waveform, or another sensing waveform.

Aspect 21: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the network entity to perform a method of any of aspects 1 through 7.

Aspect 22: A network entity for wireless communications, comprising at least one means for performing a method of any of aspects 1 through 7.

Aspect 23: A non-transitory computer-readable medium storing code for wireless communications, the code comprising instructions executable by one or more processors to perform a method of any of aspects 1 through 7.

Aspect 24: An apparatus for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the apparatus to perform a method of any of aspects 8 through 15.

Aspect 25: An apparatus for wireless communications, comprising at least one means for performing a method of any of aspects 8 through 15.

Aspect 26: A non-transitory computer-readable medium storing code for wireless communications, the code comprising instructions executable by one or more processors (e.g., directly, indirectly, after pre-processing, without pre-processing) to perform a method of any of aspects 8 through 15.

Aspect 27: A second wireless device for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the second wireless device to perform a method of any of aspects 16 through 20.

Aspect 28: A second wireless device for wireless communications, comprising at least one means for performing a method of any of aspects 16 through 20.

Aspect 29: A non-transitory computer-readable medium storing code for wireless communications, the code comprising instructions executable by one or more processors (e.g., directly, indirectly, after pre-processing, without pre-processing) to perform a method of any of aspects 16 through 20.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
one or more memories storing processor-executable code; and
one or more processors coupled with the one or more memories and individually or collectively operable to execute the code to cause the network entity to:
obtain a first set of one or more parameters associated with at least one first wireless device based at least in part on a sensing procedure;
obtain a second set of one or more parameters associated with the at least one first wireless device according to a learning model for energy management and the first set of one or more parameters, wherein the first set of one or more parameters comprises an input to the learning model, and wherein the second set of one or more parameters comprises an output of the learning model;
receive signaling from the at least one first wireless device indicating a request for an energy management operation for the at least one first wireless device, wherein the signaling comprises an input to the learning model,
wherein performing the energy management operation is based at least in part on receiving the signaling from the at least one first wireless device; and
perform the energy management operation for the at least one first wireless device, by one or more of outputting a beamformed wave for energy charging the at least one first wireless device, or outputting an indication to transmit a beamformed wave for energy charging the at least one first wireless device to at least one second wireless device, based at least in part on the second set of one or more parameters and according to the learning model for energy management.

2. The network entity of claim 1, wherein the one or more processors are individually or collectively further operable to execute the code to cause the network entity to:
schedule one or more resources for outputting the beamformed wave based at least in part on the first set of one or more parameters and the second set of one or more parameters and according to the learning model for energy management.

3. The network entity of claim 1, wherein the one or more processors are individually or collectively further operable to execute the code to cause the network entity to:

determine a capability of the at least one second wireless device based at least in part on the sensing procedure wherein performing the energy management operation is in accordance with the capability of the at least one second wireless device.

4. The network entity of claim 1, wherein the one or more processors are individually or collectively further operable to execute the code to cause the network entity to:

receive signaling from the at least one second wireless device indicating a request for an energy management operation for the at least one first wireless device, wherein the signaling comprises an input to the learning model, and wherein performing the energy management operation is based at least in part on receiving the signaling from the at least one second wireless device.

5. The network entity of claim 1, wherein the one or more processors are individually or collectively further operable to execute the code to cause the network entity to:

obtain a third set of one or more parameters associated with the at least one first wireless device according to the learning model and based at least in part on a handover event at the at least one first wireless device.

6. The network entity of claim 1, wherein the beamformed wave comprises a frequency modulated continuous wave (FMCW) waveform, an orthogonal frequency-division multiplexing (OFDM) waveform, or another sensing waveform.

7. A first wireless device, comprising:

one or more memories storing processor-executable code; and one or more processors coupled with the one or more memories and individually or collectively operable to execute the code to cause the first wireless device to:

perform a sensing procedure;

transmit signaling to one or more of a network entity or at least one second wireless device based at least in part on the sensing procedure, the signaling indicating a request for an energy management operation;

perform the energy management operation using a beamformed wave for energy charging the first wireless device transmitted by one or more of the network entity or the at least one second wireless device; and transmit, to the network entity, a report indicating a status of the first wireless device based at least in part on performing the energy management operation and receiving a request to report the status of the at least one second wireless device from the network entity.

8. The first wireless device of claim 7, wherein the one or more processors are individually or collectively further operable to execute the code to cause the first wireless device to:

perform one or more measurements on the beamformed wave for energy charging the first wireless device; and transmit a report to the network entity indicating a signal strength of the beamformed wave, a battery level of the first wireless device, or both.

9. The first wireless device of claim 8, wherein the first wireless device performs the one or more measurements based at least in part on the signal strength of the beamformed wave satisfying a threshold, based at least in part on the battery level satisfying a threshold, or in accordance with a periodicity.

10. The first wireless device of claim 8, wherein the one or more processors are individually or collectively further operable to execute the code to cause the first wireless device to:

refrain from transmitting a second report to the network entity based at least in part on the battery level satisfying a threshold.

11. The first wireless device of claim 7, wherein the one or more processors are individually or collectively further operable to execute the code to cause the first wireless device to:

receive an indication from the network entity to refrain from transmitting a second report.

12. The first wireless device of claim 7, wherein the beamformed wave comprises a frequency modulated continuous wave (FMCW) waveform, an orthogonal frequency-division multiplexing (OFDM) waveform, or another sensing waveform.

13. The first wireless device of claim 7, wherein the signaling comprises a last report message or a power request message.

14. A second wireless device, comprising:

one or more memories storing processor-executable code; and one or more processors coupled with the one or more memories and individually or collectively operable to execute the code to cause the second wireless device to:

receive, from a network entity, an indication for the second wireless device to transmit a beamformed wave for energy charging at least one first wireless device;

receive signaling from the at least one first wireless device;

relay the signaling from the at least one first wireless device to the network entity in accordance with a capability of the second wireless device; and communicate with the network entity, the at least one first wireless device, or both in accordance with the capability of the second wireless device and based at least in part on receiving the indication from the network entity.

15. The second wireless device of claim 14, wherein the one or more processors are individually or collectively further operable to execute the code to cause the second wireless device to:

monitor resources for signaling from the at least one first wireless device to the network entity in accordance with a request from the network entity to monitor the at least one first wireless device; and relay the signaling to the network entity based at least in part on determining that the network entity failed to receive the signaling from the at least one first wireless device.

16. The second wireless device of claim 14, wherein, to communicate with the network entity, the at least one first wireless device, or both, the one or more processors are individually or collectively further operable to execute the code to cause the second wireless device to:

determine one or more parameters associated with the beamformed wave for energy charging the at least one first wireless device; and transmit the beamformed wave to the at least one first wireless device.

17. The second wireless device of claim 14, wherein the beamformed wave comprises a frequency modulated continuous wave (FMCW) waveform, an orthogonal frequency-division multiplexing (OFDM) waveform, or another sensing waveform.

* * * * *